United States Patent
Jeong et al.

(10) Patent No.: US 11,217,878 B2
(45) Date of Patent: Jan. 4, 2022

(54) DUAL POLARIZED ANTENNA AND ELECTRONIC DEVICE INCLUDING THE SAME

(71) Applicant: Samsung Electronics Co., Ltd., Suwon-si (KR)

(72) Inventors: Myunghun Jeong, Suwon-si (KR); Jaehoon Jo, Suwon-si (KR); Dongyeon Kim, Suwon-si (KR); Hosaeng Kim, Suwon-si (KR); Seongjin Park, Suwon-si (KR); Sumin Yun, Suwon-si (KR); Woomin Jang, Suwon-si (KR); Jehun Jong, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/788,822

(22) Filed: Feb. 12, 2020

(65) Prior Publication Data

US 2020/0266521 A1    Aug. 20, 2020

(30) Foreign Application Priority Data

Feb. 15, 2019 (KR) .................. 10-2019-0017915

(51) Int. Cl.
*H01Q 1/24* (2006.01)
*H04M 1/02* (2006.01)
(Continued)

(52) U.S. Cl.
CPC .......... *H01Q 1/243* (2013.01); *H01Q 1/2283* (2013.01); *H01Q 9/0407* (2013.01); *H04M 1/0266* (2013.01)

(58) Field of Classification Search
CPC .... H01Q 1/243; H01Q 1/1221; H01Q 1/2283; H01Q 1/405; H01Q 9/0407; H01Q 9/045; H01Q 21/08; H01Q 21/24
See application file for complete search history.

(56) References Cited

U.S. PATENT DOCUMENTS

| 5,708,444 A | 1/1998 | Pouwels et al. |
| 6,515,628 B2 | 2/2003 | Roberts |

(Continued)

FOREIGN PATENT DOCUMENTS

| JP | 2019-009763 A | 1/2019 |
| KR | 10-0965729 B1 | 6/2010 |
| KR | 10-2020-0007377 A | 1/2020 |

OTHER PUBLICATIONS

International Search Report dated May 22, 2020, issued in an International Application No. PCT/KR2020/001947.

*Primary Examiner* — Hoang V Nguyen
(74) *Attorney, Agent, or Firm* — Jefferson IP Law, LLP

(57) ABSTRACT

An electronic device is provided. The electronic device includes a housing and an antenna structure. The housing includes a front plate, a rear plate, and a lateral member surrounding a space between the front and rear plates. The antenna structure is disposed in the space includes a printed circuit board (PCB) disposed in the space and includes a ground layer at least in part. The antenna structure further includes at least one conductive patch disposed on the PCB in a second direction and configured to transmit and/or receive first and second signals having a frequency between about 3 GHz and about 100 GHz. The conductive patch includes a first feeder and a second feeder. The first feeder is disposed on a first virtual line passing through a center of the conductive patch and forming a first angle with respect to a virtual axis passing through the center and perpendicular to the second direction, and configured to transmit and/or (Continued)

receive the first signal having a first polarization. The second feeder is disposed on a second virtual line passing through the center and forming a second angle with respect to the virtual axis, and configured to transmit and/or receive the second signal having a second polarization perpendicular to the first polarization. A sum of the first and second angles is substantially 90 degrees.

18 Claims, 30 Drawing Sheets

(51) Int. Cl.
*H01Q 9/04* (2006.01)
*H01Q 1/22* (2006.01)

(56) References Cited

U.S. PATENT DOCUMENTS

| | | |
|---|---|---|
| 9,293,829 B2 | 3/2016 | Kim et al. |
| 10,777,872 B1 | 9/2020 | Glabe et al. |
| 2004/0070836 A1 | 4/2004 | Rosenthal |
| 2004/0095282 A1* | 5/2004 | Fukushima .......... H01Q 9/0442 343/702 |
| 2009/0128413 A1 | 5/2009 | Crouch et al. |
| 2010/0103049 A1 | 4/2010 | Tabakovic |
| 2012/0212376 A1* | 8/2012 | Jan ...................... H01Q 9/0435 343/700 MS |
| 2013/0234908 A1 | 9/2013 | Howard et al. |
| 2018/0358686 A1 | 12/2018 | Ark |
| 2018/0375197 A1 | 12/2018 | Liu et al. |
| 2019/0006751 A1 | 1/2019 | Chen et al. |
| 2019/0165478 A1 | 5/2019 | Jo et al. |
| 2020/0021015 A1 | 1/2020 | Yun et al. |

* cited by examiner

FIG. 13A

| | | \multicolumn{9}{c}{OVERLAP HEIGHT (H)} |
|---|---|---|---|---|---|---|---|---|---|---|
| | | 0.00 | 0.20 | 0.40 | 0.60 | 0.40 | 0.40 | 0.40 | 0.40 | 0.40 |
| SEPARATION DISTANCE (D) | 0.00 | 8.91 | 8.91 | 8.91 | 8.91 | 8.91 | 8.91 | 8.58 | 7.45 | 6.68 |
| | 0.50 | 8.91 | 8.88 | 8.86 | 8.84 | 8.79 | 8.71 | 8.53 | 8.41 | 8.31 |
| | 1.00 | 8.90 | 8.89 | 8.91 | 8.91 | 8.87 | 8.77 | 8.57 | 8.33 | 8.08 |
| | 1.50 | 8.90 | 8.91 | 8.95 | 8.91 | 8.80 | 8.59 | 8.27 | 8.36 | 8.09 |
| | 2.00 | 8.90 | 8.90 | 8.86 | 8.65 | 8.16 | 7.54 | 7.02 | 7.96 | 7.68 |
| | 2.50 | 8.91 | 8.83 | 8.68 | 8.29 | 7.21 | 7.21 | 5.38 | 6.70 | 6.59 |

FIG. 13B

| | | OVERLAP HEIGHT (H) | | | | | | | |
|---|---|---|---|---|---|---|---|---|---|
| | | 0.00 | 0.20 | 0.40 | 0.60 | 0.40 | 0.40 | 0.40 | 0.40 | 0.40 |
| SEPARATION DISTANCE (D) | 0.00 | 8.91 | 8.91 | 8.91 | 8.91 | 8.91 | 8.91 | 8.58 | 7.45 | 6.68 |
| | 0.50 | 8.91 | 8.88 | 8.86 | 8.84 | 8.79 | 8.71 | 8.53 | 8.41 | 8.31 |
| | 1.00 | 8.90 | 8.89 | 8.91 | 8.91 | 8.87 | 8.77 | 8.57 | 8.33 | 8.08 |
| | 1.50 | 8.90 | 8.91 | 8.95 | 8.91 | 8.80 | 8.59 | 8.27 | 8.36 | 8.09 |
| | 2.00 | 8.90 | 8.90 | 8.86 | 8.65 | 8.16 | 7.54 | 7.02 | 7.96 | 7.68 |
| | 2.50 | 8.91 | 8.83 | 8.68 | 8.29 | 7.21 | 7.21 | 5.38 | 6.70 | 6.59 |

DUAL POLARIZED ANTENNA AND ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2019-0017915, filed on Feb. 15, 2019, in the Korean Intellectual Property Office, the disclosures of which is incorporated by reference herein in its entirety.

BACKGROUND

1. Field

The disclosure relates to a dual polarized antenna and an electronic device including the same.

2. Description of Related Art

With the development of wireless communication technology, communication electronic devices are commonly used in daily life, thereby exponentially increasing the use of contents. Accordingly, a network capacity limit may be nearing exhaustion. After commercialization of 4th generation (4G) communication systems, in order to meet growing wireless data traffic demand, a communication system (e.g., 5th generation (5G), pre-5G communication system, or new radio (NR)) that transmits and/or receives signals using a frequency of a high frequency (e.g., millimeter wave (mm-Wave)) band (e.g., 3 gigahertz (GHz) to 300 GHz band) is being developed.

Next-generation wireless communication technologies are currently developed to permit signal transmission/reception using frequencies in the range of 3 GHz to 100 GHz, overcome a high free space loss due to frequency characteristics, implement an efficient mounting structure for increasing an antenna gain, and realize a related new structure of an antenna module.

The antenna module that operates in the above-mentioned operating frequency band may include, as an antenna element, at least one conductive patch capable of easily implementing a high gain and a dual polarization. For example, the antenna module may include a plurality of conductive patches spaced apart at regular intervals on a printed circuit board (e.g., an antenna structure). In case of implementing the dual polarization, these conductive patches may be configured to form both a vertical polarization and a horizontal polarization through a pair of feeders that are disposed at symmetrical positions with respect to an imaginary line passing through the center of the conductive patch so as to simultaneously transmit separate radio signals via two carriers at the same frequency without interference. For example, one feeder may be disposed on a virtual line parallel to a first side of the printed circuit board and passing through the center of the conductive patch, and the other feeder may be disposed on a virtual line parallel to a second side of the printed circuit board and passing through the center of the conductive patch.

However, in this arrangement of the feeders, the ground of the printed circuit board has different sizes (e.g., areas) for the respective feeders, so that a gain difference may be caused and also spatial multiple-input multiple-output (MIMO) characteristics may be degraded. Moreover, when this antenna module is mounted perpendicularly in an electronic device such that the conductive patch and a conductive lateral member face each other, a gain difference between two polarizations may be further increased due to the conductive lateral member.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a dual polarized antenna and an electronic device including the same.

Another aspect of the disclosure is to provide a dual polarized antenna capable of maintaining the same radiation performance between two feeders, and an electronic device including the dual polarized antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing and an antenna structure. The housing may include a front plate facing a first direction, a rear plate facing a direction opposite to the first direction, and a lateral member surrounding a space between the front plate and the rear plate. The antenna structure may be disposed in the space and includes a printed circuit board (PCB) disposed in the space and includes a ground layer at least in part. The antenna structure may further include at least one conductive patch disposed on the PCB in a second direction and configured to transmit and/or receive first and second signals having a frequency between about 3 GHz and about 100 GHz. The conductive patch may include a first feeder and a second feeder. The first feeder may be disposed on a first virtual line passing through a center of the conductive patch and forming a first angle with respect to a virtual axis passing through the center and perpendicular to the second direction, and configured to transmit and/or receive the first signal having a first polarization. The second feeder may be disposed on a second virtual line passing through the center and forming a second angle with respect to the virtual axis, and configured to transmit and/or receive the second signal having a second polarization perpendicular to the first polarization. A sum of the first and second angles may be substantially 90 degrees.

In accordance with another aspect of the disclosure, an electronic device is provided. The electronic device includes a housing, a display, a printed circuit board (PCB), and at least one conductive patch. The housing may include a front plate facing a first direction, a rear plate facing a direction opposite to the first direction, and a lateral member surrounding a space between the front plate and the rear plate. The display may be disposed in the space to be visible from outside through at least a part of the front plate. The PCB may be disposed in the space and includes a ground layer at least in part. The conductive patch may be disposed on the PCB in a second direction and configured to transmit and/or receive first and second signals having a frequency between about 3 GHz and about 100 GHz. The conductive patch may include a first feeder and a second feeder. The first feeder may be disposed on a first virtual line passing through a center of the conductive patch and forming a first angle with respect to a virtual axis passing through the center and perpendicular to the second direction, and configured to transmit and/or receive the first signal having a first polarization. The second feeder may be disposed on a second virtual line passing through the center and forming a second angle with respect to the virtual axis, and configured to transmit and/or receive the second signal having a second polarization perpendicular to the first polarization. A sum of the first and second angles may be substantially 90 degrees.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIGS. 13A and 13B are tables showing gain characteristics of two feeders of an antenna module in accordance with changes in an overlap height and a separation distance between the conductive portion and the antenna module shown in FIG. 10A according to various embodiments of the disclosure;

Throughout the drawings, it should be noted that like reference numbers are used to depict the same or similar elements, features, and structures.

DETAILED DESCRIPTION

Figure 1:
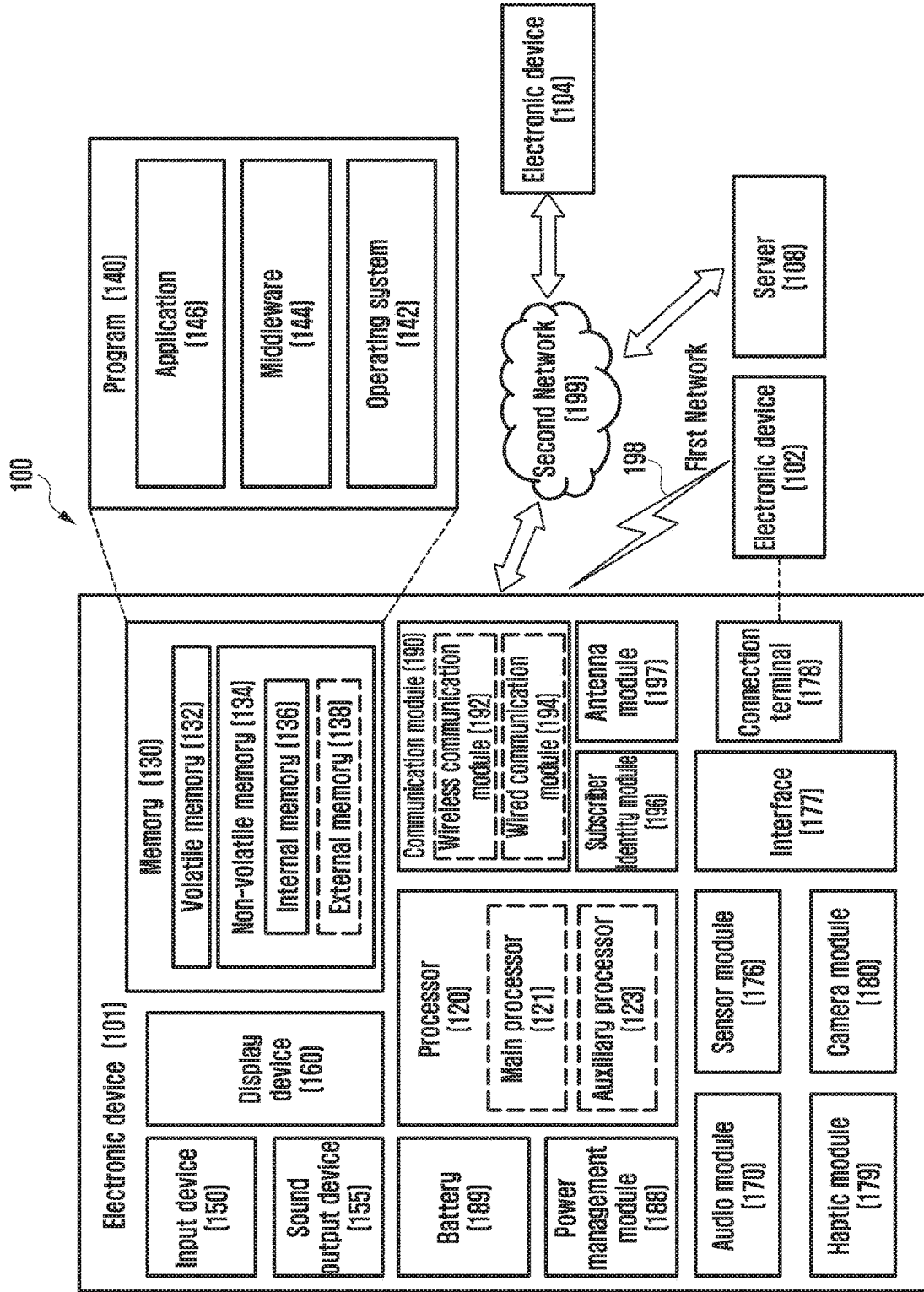
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

With regard to the description of the drawings, similar reference numerals may be used to refer to similar or related elements.

As used herein, each of such phrases as "A or B", "at least one of A and B", "at least one of A or B", "A, B, or C", "at least one of A, B, and C", and "at least one of A, B, or C"

may include any one of, or all possible combinations of the items enumerated together in a corresponding one of the phrases.

As used herein, such terms as "1st" and "2nd", or "first" and "second" may be used to distinguish a corresponding component from another, and does not limit the components in another aspect, such as importance or order. If an element, such as a first element, is referred to, with or without the term "operatively" or "communicatively", as "coupled with", "coupled to", "connected with", or "connected to" another element, such as a second element, this indicates that the first element may be coupled with the second element directly (e.g., wiredly), wirelessly, or via a third element.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.(not shown) The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. At least one of the components may be omitted from the electronic device 101, or one or more other components may be added in the electronic device 101. Some of the components may be implemented as single integrated circuitry. For example, the sensor module 176 may be implemented as embedded in the display device 160.

The processor 120 may execute a program 140 to control at least one other hardware or software component of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 (e.g., an image signal processor (ISP) or a CP) may be implemented as part of another component (e.g., the camera module 180 or the communication module 190) functionally related to the auxiliary processor 123.

The memory 130 may store various data used by at least one component of the electronic device 101, such as the program 140 and input data or output data for a command related thereto. The memory 130 may include the volatile memory 132 or the non-volatile memory 134.

The program 140 may be stored in the memory 130 as software and may include an operating system (OS) 142, middleware 144, and applications 146.

The input device 150 may receive a command or data to be used by the processor 120 of the electronic device 101, from the outside (e.g., a user) of the electronic device 101. The input device 150 may include a microphone, a mouse, a keyboard, or a digital pen.

The audio output device 155 may output sound signals to the outside of the electronic device 101 and may include a speaker or a receiver. The speaker may be used for general purposes, such as playing multimedia or playing record, and the receiver may be used for receiving incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and an illuminance sensor.

The interface 177 may support one or more specified protocols to be used for the electronic device 101 to be coupled with the external electronic device 102 directly (e.g., wiredly) or wirelessly. The interface 177 may include a high definition multimedia interface (HDMI), a universal serial bus (USB) interface, a secure digital (SD) card interface, or an audio interface.

A connection terminal 178 may include a connector via which the electronic device 101 may be physically connected with the external electronic device 102. The connection terminal 178 may include an HDMI connector, a USB connector, an SD card connector, or an audio connector.

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101 and may include a primary cell which is not rechargeable, a secondary cell which is rechargeable, or a fuel cell.

The communication module 190 may support establishing a direct communication channel or a wireless communication channel between the electronic device 101 and the external electronic device and performing communication via the established communication channel. The communication module 190 may include one or more communication processors that are operable independently from the processor 120 (e.g., the AP) and supports a direct communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)).

These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the external electronic device. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

An electronic device according to an embodiment may be one of various types of electronic devices, including, but not limited to a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
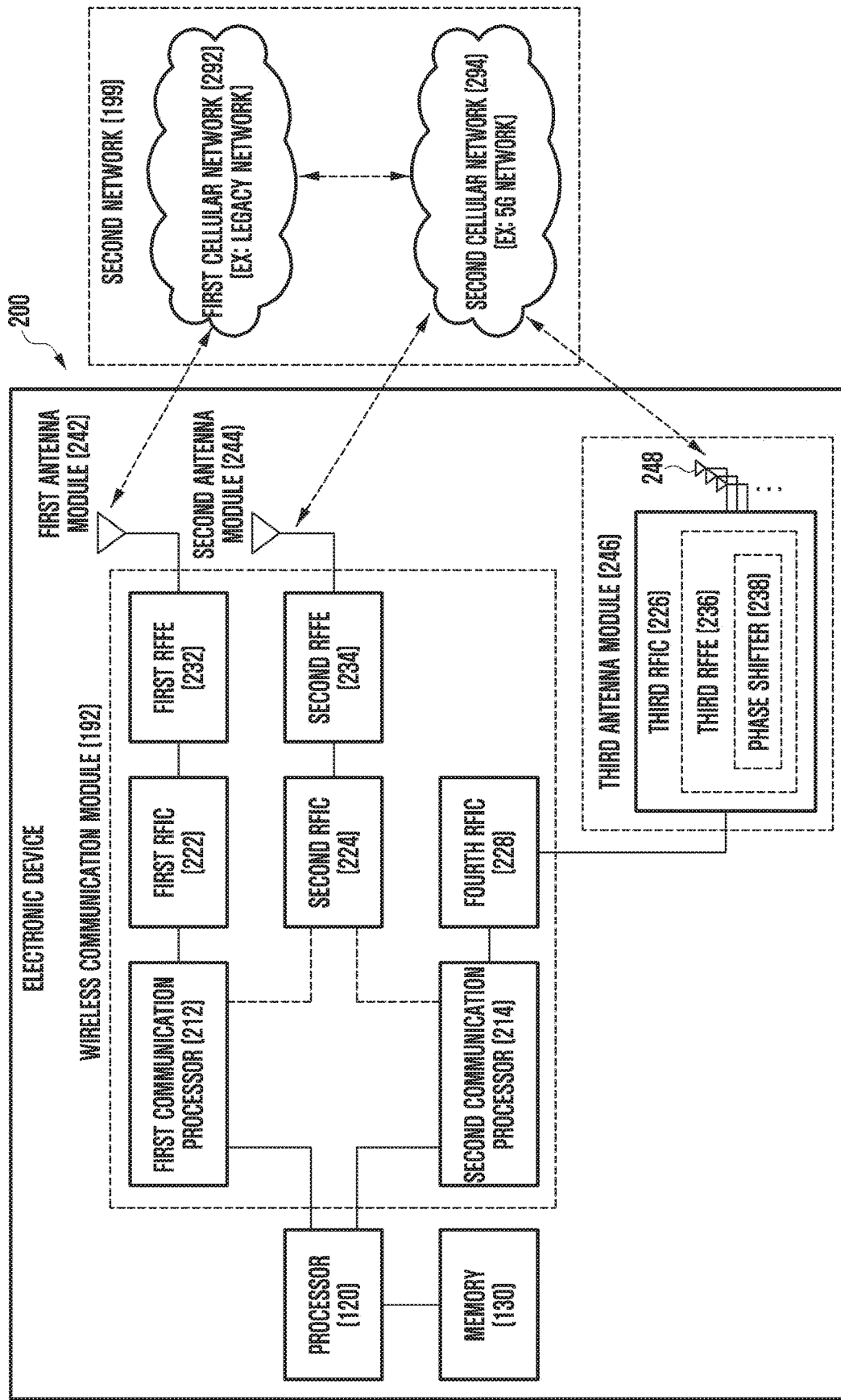
FIG. 2 is a block diagram illustrating an electronic device for supporting a legacy network communication and a 5th generation (5G) network communication according to an embodiment of the disclosure.

FIG. 2 illustrates an electronic device 200 in a network environment including a plurality of cellular networks according to an embodiment of the disclosure.

Referring to FIG. 2, the electronic device 101 includes a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, antenna 248, processor 120, and memory 130. A second network 199 includes a first cellular network 292 and a second cellular network 294. The electronic device 101 may further include at least one of the components described with reference to FIG. 1, and the second network 199 may further include at least one other network. The first communication processor 212, second communication processor 214, first RFIC 222, second RFIC 224, fourth RFIC 228, first RFFE 232, and second RFFE 234 may form at least part of the wireless communication module 192. The fourth RFIC 228 may be omitted or included as part of the third RFIC 226.

The first communication processor 212 may establish a communication channel of a band to be used for wireless communication with the first cellular network 292 and support legacy network communication through the established communication channel. The first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. The second cellular network 294 may be a 5G network defined in the 3G partnership project (3GPP).

The first communication processor 212 or the second communication processor 214 may establish a communication channel corresponding to another designated band (e.g., about 6 GHz or less) of bands to be used for wireless communication with the second cellular network 294 and support 5G network communication through the established communication channel. The first communication processor 212 and the second communication processor 214 may be implemented in a single chip or a single package. The first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 through the first antenna module 242 and be preprocessed through the first RFFE 232. The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network).

Upon reception, a 5G Sub6 RF signal may be obtained from the second cellular network 294 (e.g., 5G network) through the second antenna module 244 and be pretreated through the second RFFE 234. The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 through the antenna 248 and be preprocessed through the third RFFE 236. The third RFIC 226 may convert the preprocessed 5G Above6 RF signal to a baseband signal so as to be processed by the second communication processor 214. The third RFFE 236 may be formed as part of the third RFIC 226.

The electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 through the antenna 248 and be converted to an IF signal by the third RFIC 226. The fourth RFIC 228 may convert an IF signal to a baseband signal so as to be processed by the second communication processor 214.

The first RFIC 222 and the second RFIC 224 may be implemented into at least part of a single package or a single chip. The first RFFE 232 and the second RFFE 234 may be implemented into at least part of a single package or a single chip. At least one of the first antenna module 242 and the second antenna module 244 may be omitted or may be combined with another antenna module to process RF signals of a corresponding plurality of bands.

The third RFIC 226 and the antenna 248 may be disposed at the same substrate to form a third antenna module 246. For example, the wireless communication module 192 or the processor 120 may be disposed at a first substrate (e.g., main printed circuit board (PCB)). The third RFIC 226 is disposed in a partial area (e.g., lower surface) of the first substrate and a separate second substrate (e.g., sub PCB), and the antenna 248 is disposed in another partial area (e.g., upper surface) of the first substrate and a separate second substrate, thereby forming the third antenna module 246. By disposing the third RFIC 226 and the antenna 248 in the same substrate, a length of a transmission line therebetween can be reduced. This may reduce a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294.

The antenna 248 may be formed in an antenna array including a plurality of antenna elements that may be used for beamforming. In this case, the third RFIC 226 may include a plurality of phase shifters 238 corresponding to a plurality of antenna elements as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 may operate (e.g., standalone (SA)) independently of the first cellular network 292 (e.g., legacy network) or may be operated (e.g., non-standalone (NSA)) in connection with the first cellular network 292. For example, the 5G network may have only an access network (e.g., 5G radio access network (RAN) or a next generation (NG) RAN and have no next generation core (NGC). After accessing to the access network of the 5G network, the electronic device 101 may access to an external network (e.g., Internet) under the control of a core network (e.g., an evolved packed core (EPC)) of the legacy network. LTE protocol information for communication with a legacy network or new radio (NR) protocol information for communication with a 5G network may be stored in the memory 130 to be accessed by the processor 120, the first communication processor 212, or the second communication processor 214.

Figure 3A:
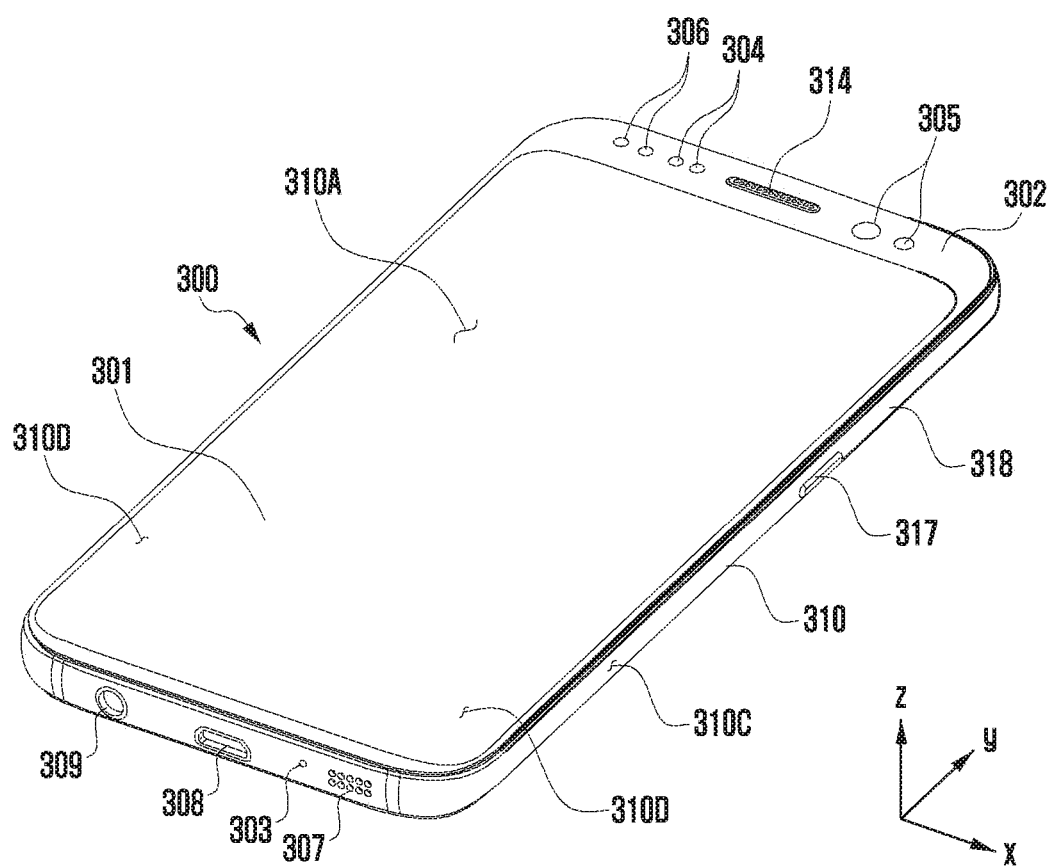
FIG. 3A is a perspective view showing a front surface of a mobile electronic device according to an embodiment of the disclosure.

FIG. 3A is a front perspective view illustrating a mobile electronic device 300 according to an embodiment of the disclosure.

Figure 3B:
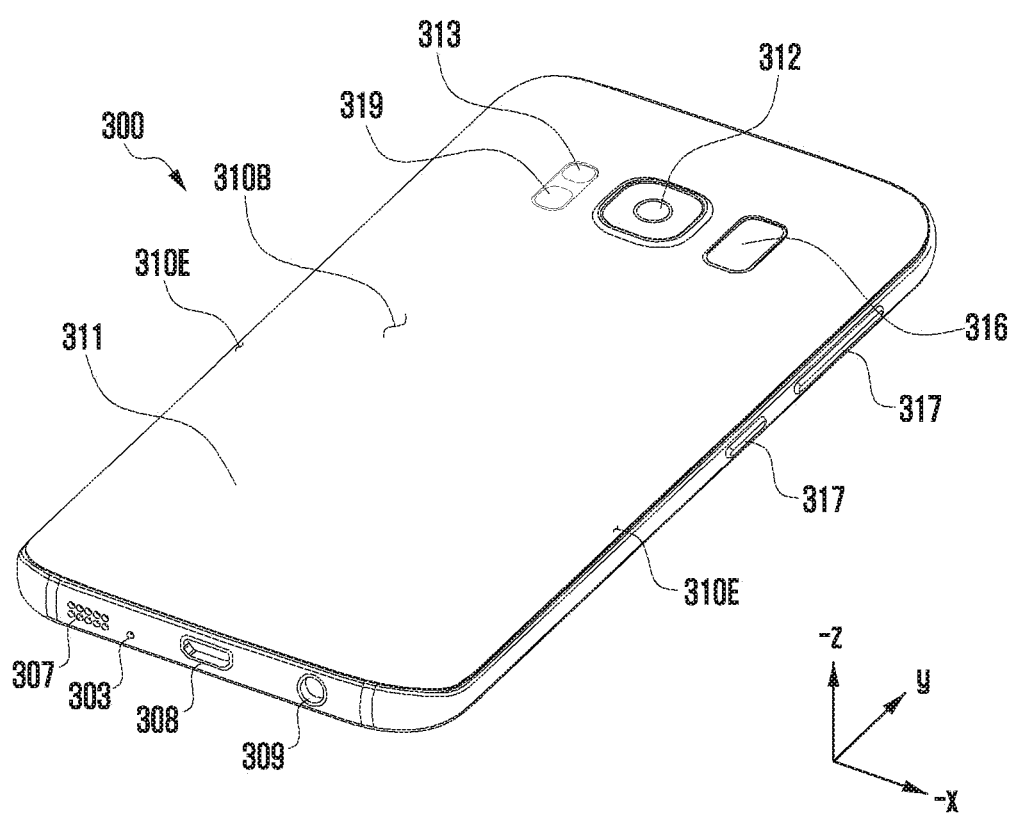
FIG. 3B is a perspective view showing a rear surface of the mobile electronic device shown in FIG. 3A according to an embodiment of the disclosure.

FIG. 3B is a rear perspective view illustrating a mobile electronic device 300 according to an embodiment of the disclosure.

Referring to FIGS. 3A and 3B, the mobile electronic device 300 includes a housing 310 including a first surface (or front surface) 310A, a second surface (or rear surface) 310B, and a side surface 310C enclosing a space between the first surface 310A and the second surface 310B. The housing may refer to a structure forming some of the first surface 310A, the second surface 310B, and the side surface 310C. The first surface 310A may be formed by an at least partially substantially transparent front plate 302 (e.g., a polymer plate or a glass plate including various coating layers). The second surface 310B may be formed by a substantially opaque rear plate 311. The rear plate 311 may be formed by coated or colored glass, ceramic, polymer, metal (e.g., aluminum, stainless steel (STS), or magnesium), or a combination of at least two of the above materials. The side surface 310C may be coupled to the front plate 302 and the rear plate 311 and be formed by a side bezel structure (or "side member") 318 including a metal and/or a polymer. The rear plate 311 and the side bezel structure 318 may be integrally formed and include the same metal material, such as aluminum.

The front plate 302 may include two first regions 310D bent and extended seamlessly from the first surface 310A toward the rear plate 311 at both ends of a long edge of the front plate 302. In FIG. 3B, the rear plate 311 may include two second regions 310E bent and extended seamlessly from the second surface 310B towards the front plate 302 at both ends of a long edge. The front plate 302 (or the rear plate 311) may include only one of the first regions 310D (or the second regions 310E). A portion of the first regions W the above embodiments, when viewed from the side surface of the mobile electronic device 300, the side bezel structure 318 may have a first thickness (or width) at a side surface in which the first region 310D or the second region 310E is not included and have a second thickness less than the first thickness at a side surface including the first region 310D or the second region 310E.

The mobile electronic device 300 may include at least one of a display 301, audio modules 303, 307, and 314 sensor modules 304, 316, and 319, camera modules 305, 312, and 313, a key input device 317, a light emitting element 306, and connector holes 308 and 309. The mobile electronic device 300 may omit at least one of the components or may further include other components.

The display 301 may be exposed through a substantial portion of the front plate 302. At least part of the display 301 may be exposed through the front plate 302 forming the first region 310D of the side surface 310C and the first surface 310A. An edge of the display 301 may be formed to be substantially the same as an adjacent outer edge shape of the front plate 302. In order to enlarge an area where the display 301 is exposed, a distance between an outer edge of the display 301 and an outer edge of the front plate 302 may be formed to be substantially the same.

A recess or an opening may be formed in a portion of a screen display area of the display 301, and at least one of the audio module 314 and the sensor module 304, the camera module 305, and the light emitting element 306 aligned with the recess or the opening may be included. At least one of the audio module 314, the sensor module 304, the camera module 305, the fingerprint sensor module 316, and the light emitting element 306 may be included at a rear surface of a screen display area of the display 301. The display 301 may be coupled to or disposed adjacent to a touch detection circuit, a pressure sensor capable of measuring intensity (pressure) of the touch, and/or a digitizer for detecting a stylus pen of a magnetic field method. At least part of the sensor modules 304 and 319 and/or at least part of the key input device 317 may be disposed in a first region 310D and/or a second region 310E.

The audio modules 303, 307, and 314 may include a microphone hole 303 and speaker holes 307 and 314. The microphone hole 303 may dispose a microphone for obtaining an external sound, and plurality of microphones may be disposed to detect a direction of a sound. The speaker holes 307 and 314 may include an external speaker hole 307 and a call receiver hole 314. The speaker holes 307 and 314 and the microphone hole 303 may be implemented into one hole, or the speaker may be included without the speaker holes 307 and 314 (e.g., piezo speaker).

The sensor modules 304, 316, and 319 may generate an electrical signal or a data value corresponding to an operating state inside the mobile electronic device 300 or an environment state outside the mobile electronic device 300. The sensor modules 304, 316, and 319 may include a first sensor module 304 (e.g., proximity sensor) and/or a second sensor module (e.g., fingerprint sensor), disposed at the first surface 310A of the housing 310, and/or a third sensor module 319 (e.g., a heart rate monitor (HRM) sensor) and/or a fourth sensor module 316 (e.g., fingerprint sensor), disposed at the second surface 310B of the housing 310. The fingerprint sensor may be disposed at the second surface 310B as well as the first surface 310A (e.g., the display 301) of the housing 310. The mobile electronic device 300 may further include at least one of a gesture sensor, gyro sensor, air pressure sensor, magnetic sensor, acceleration sensor, grip sensor, color sensor, IR sensor, biometric sensor, temperature sensor, humidity sensor, and illumination sensor 304.

The camera modules 305, 312, and 313 may include a first camera device 305 disposed at the first surface 310A of the mobile electronic device 300, a second camera device 312 disposed at the second surface 310B of the mobile electronic device 300, and/or a flash 313. The camera modules 305 and 312 may include one or a plurality of lenses, an image sensor, and/or an image signal processor. The flash 313 may include a light emitting diode or a xenon lamp. Two or more lenses (infrared camera, wide angle and telephoto lens) and image sensors may be disposed at one surface of the mobile electronic device 300.

The key input device 317 may be disposed at the side surface 310C of the housing 310. The mobile electronic device 300 may not include some or all of the above-described key input devices 317, and the key input device 317 that is not included may be implemented in other forms such as a soft key on the display 301. The key input device 317 may include a sensor module 316 disposed at the second surface 310B of the housing 310.

The light emitting element 306 may be disposed at the first surface 310A of the housing 310. The light emitting element 306 may provide status information of the mobile electronic device 300 in an optical form. In one embodiment, the light emitting element 306 may provide a light source interworking with an operation of the camera module 305. The light emitting element 306 may include a light emitting diode (LED), an IR LED, and a xenon lamp.

The connector ports 308 and 309 may include a first connector port 308 that may receive a USB connector for transmitting and receiving power and/or data to and from an external electronic device and/or a second connector hole (e.g., earphone jack) 309 that can receive a connector for transmitting and receiving audio signals to and from an external electronic device.

Figure 3C:
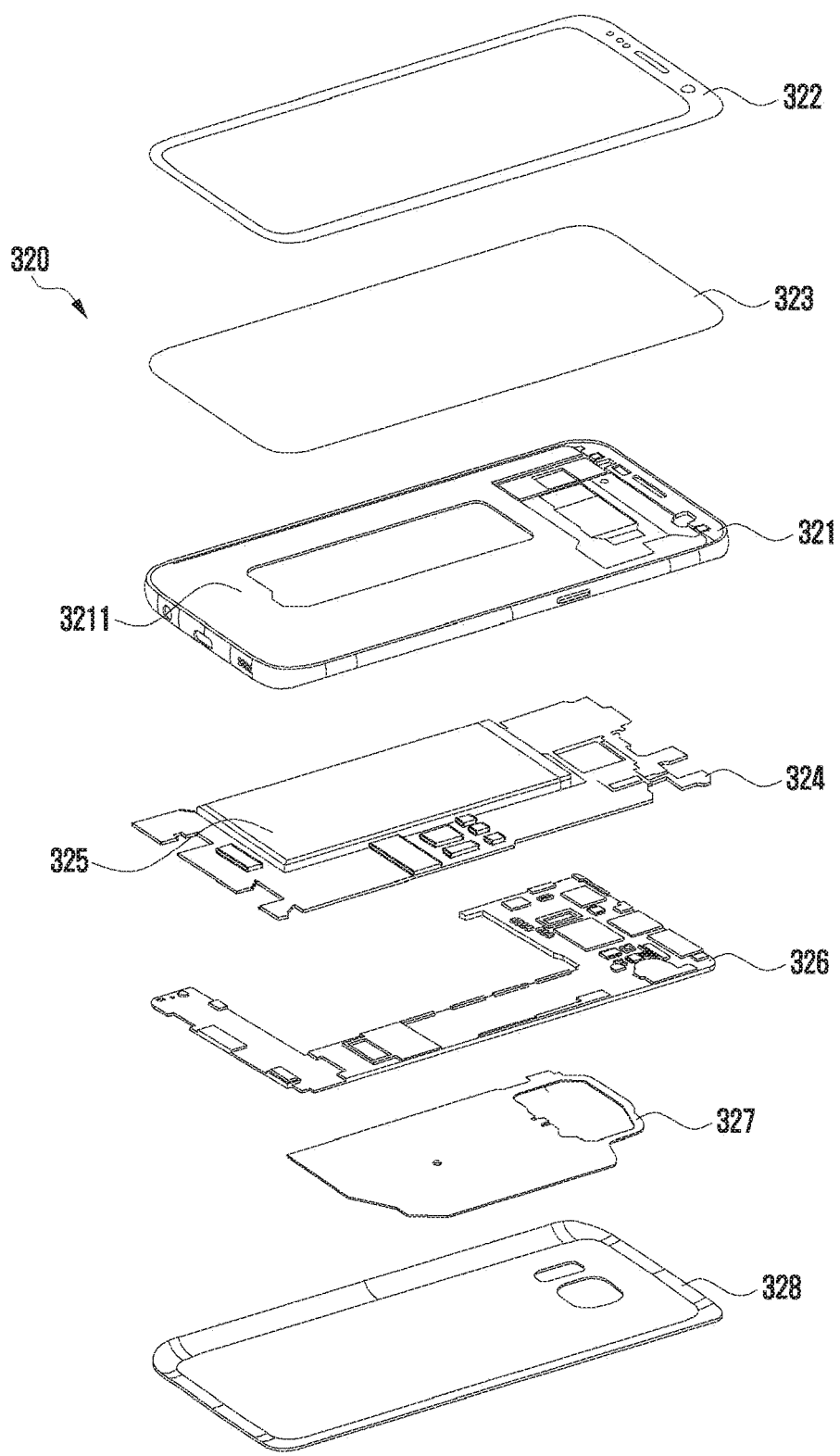
FIG. 3C is an exploded perspective view showing the mobile electronic device shown in FIGS. 3A and 3B according to an embodiment of the disclosure.

FIG. 3C is an exploded perspective view illustrating a mobile electronic device according to an embodiment of the disclosure.

Referring to FIG. 3C, the mobile electronic device 320 may include a side bezel structure 321, first support member 3211 (e.g., bracket), front plate 322, display 323, printed circuit board 324, battery 325, second support member 326 (e.g., rear case), antenna 327, and rear plate 328. The electronic device 320 may omit at least one of the components or may further include other components. At least one of the components of the electronic device 320 may be the same as or similar to at least one of the components of the mobile electronic device 300 of FIG. 3A or 3B and a duplicated description is omitted below.

The first support member 3211 may be disposed inside the electronic device 320 to be connected to the side bezel structure 321 or may be integrally formed with the side bezel structure 321. The first support member 3211 may be made of a metal material and/or a non-metal (e.g., polymer) material. The display 323 may be coupled to one surface of the first support member 3211, and the printed circuit board 324 may be coupled to an opposing surface of the first support member 3211. A processor, a memory, and/or an interface may be mounted in the printed circuit board 324. The processor may include one or more of a central processing unit, application processor, graphic processing unit, image signal processor, sensor hub processor, and communication processor.

The memory may include a volatile memory or a non-volatile memory.

The interface may include a HDMI, USB interface, SD card interface, and/or audio interface. The interface may electrically or physically connect the electronic device 320 to an external electronic device and include a USB connector, an SD card/multimedia card (MMC) connector, or an audio connector.

The battery 325 supplies power to at least one component of the electronic device 320 and may include a non-rechargeable primary battery, a rechargeable secondary battery, or a fuel cell. At least part of the battery 325 may be disposed on substantially the same plane as that of the printed circuit board 324. The battery 325 may be integrally disposed inside the electronic device 320 or may be detachably disposed in the electronic device 320.

The antenna 327 may be disposed between the rear plate 328 and the battery 325, and may include a near field communication (NFC) antenna, wireless charging antenna, and/or magnetic secure transmission (MST) antenna. The antenna 327 may perform short range communication with an external device or may wirelessly transmit and receive power required for charging. An antenna structure may be formed by some or a combination of the side bezel structure 321 and/or the first support member 3211.

Figure 4A:
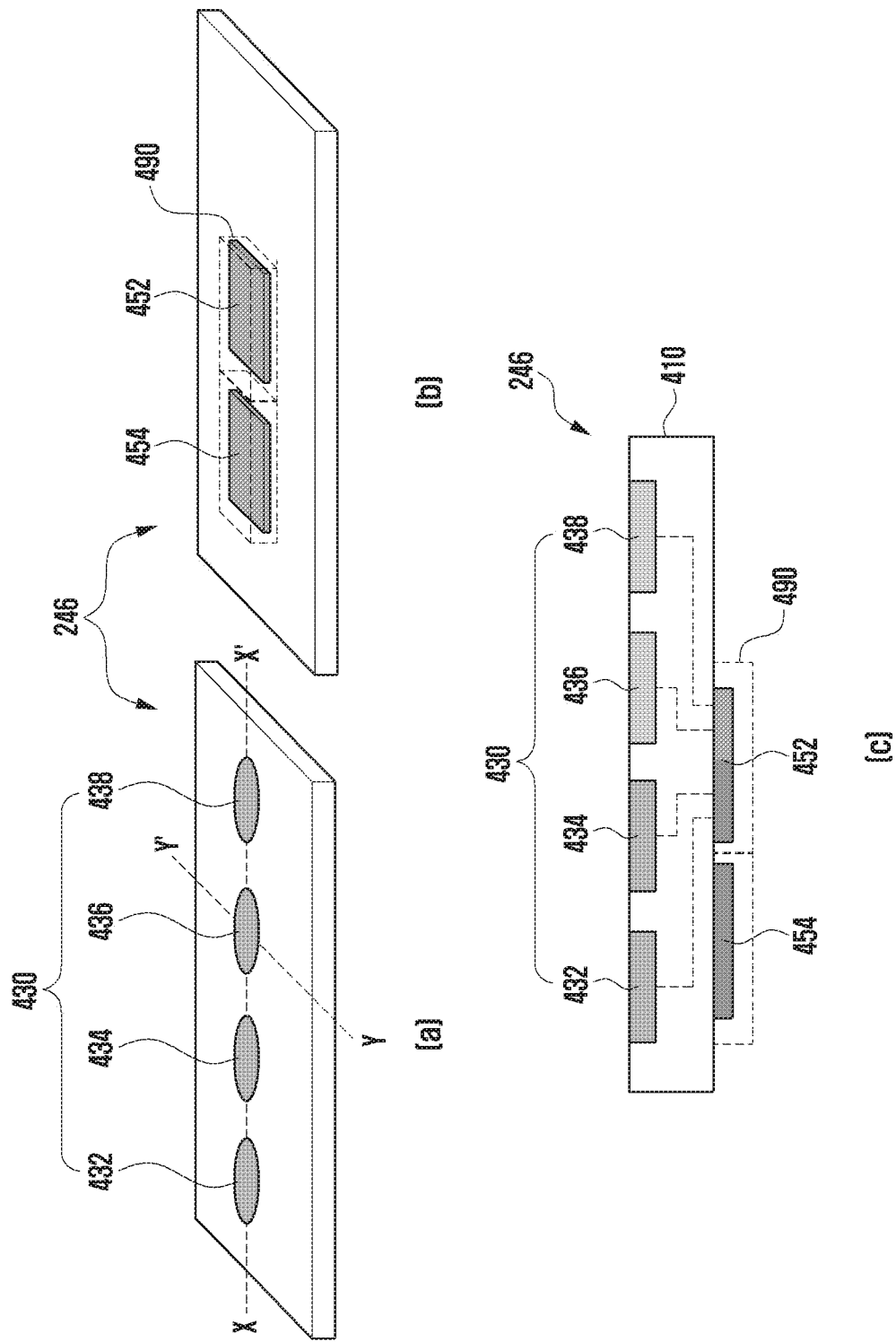
FIG. 4A shows an embodiment of a structure of the third antenna module shown in and described with reference to FIG. 2 according to an embodiment of the disclosure.

FIG. 4A illustrates a structure of a third antenna module described with reference to FIG. 2 according to an embodiment of the disclosure.

FIG. 4A at (a) is a perspective view illustrating the third antenna module 246 viewed from one side, FIG. 4A at (b) is a perspective view illustrating the third antenna module 246 viewed from the other side, and FIG. 4A at (c) is a cross-sectional view illustrating the third antenna module 246 taken along line X-X' of FIG. 4A at (a).

Referring to FIG. 4A, the third antenna module 246 includes a printed circuit board 410, an antenna array 430, a RFIC 452, and a PMIC 454. The third antenna module 246 further includes a shield member 490. At least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 includes a plurality of antenna elements 432, 434, 436, or 438 disposed to form a directional beam. The antenna elements 432, 434, 436, or 438 may be formed at a first surface of the printed circuit board 410. The antenna array 430 may be formed inside the printed circuit board 410. The antenna array 430 may include the same or a different shape or type of a plurality of antenna arrays (e.g., dipole antenna array and/or patch antenna array).

The RFIC 452 may be disposed at a second surface opposite to the first surface of the printed circuit board 410 spaced apart from the antenna array. The RFIC 452 is configured to process signals of a selected frequency band transmitted/received through the antenna array 430. Upon transmission, the RFIC 452 may convert a baseband signal obtained from a communication processor to an RF signal of a designated band. Upon reception, the RFIC 452 may convert an RF signal received through the antenna array 430 to a baseband signal and transfer the baseband signal to the communication processor.

Upon transmission, the RFIC 452 may up-convert an IF signal (e.g., about 9 GHz to about 11 GHz) obtained from an intermediate frequency integrate circuit (IFIC) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB to provide power necessary for the RFIC 452 on the antenna module.

The shielding member 490 may be disposed at a portion (e.g., the second surface) of the printed circuit board 410 so as to electromagnetically shield at least one of the RFIC 452 or the PMIC 454. The shield member 490 may include a shield can.

Alternatively, the third antenna module 246 may be electrically connected to another printed circuit board (e.g., main circuit board) through a module interface. The module interface may include a connecting member a coaxial cable connector, board to board connector, interposer, or flexible PCB (FPCB). The RFIC 452 and/or the PMIC 454 of the antenna module may be electrically connected to the printed circuit board through the connection member.

Figure 4B:
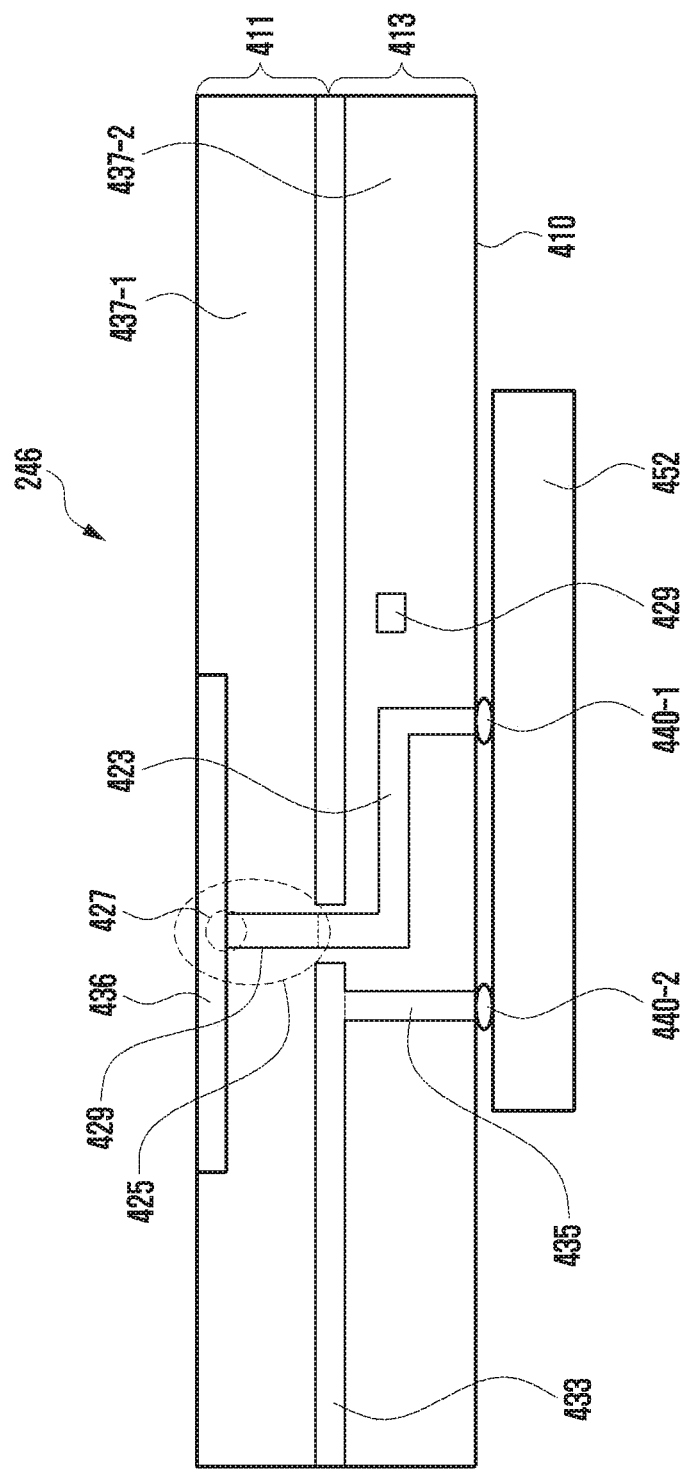
FIG. 4B is a cross-sectional view taken along the line Y-Y' in FIG. 4A according to an embodiment of the disclosure.

FIG. 4B is a cross-sectional view illustrating the third antenna module 246 taken along line Y-Y' of FIG. 4A at (a) according to an embodiment. The PCB 410 of the illustrated embodiment may include an antenna layer 411 and a network layer 413.

Referring to FIG. 4B, the antenna layer 411 includes at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 includes at least one dielectric layer 437-2, at least one ground layer 433, at least one conductive via 435, a transmission line 423, and/or a power feeding line 429 formed on or inside an outer surface of the dielectric layer.

The RFIC 452 of FIG. 4A at (c) may be electrically connected to the network layer 413 through first and second solder bumps 440-1 and 440-2. Alternatively, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. The RFIC 452 may also be electrically connected to the above-described module interface through the power feeding line 429.

Figure 5A:
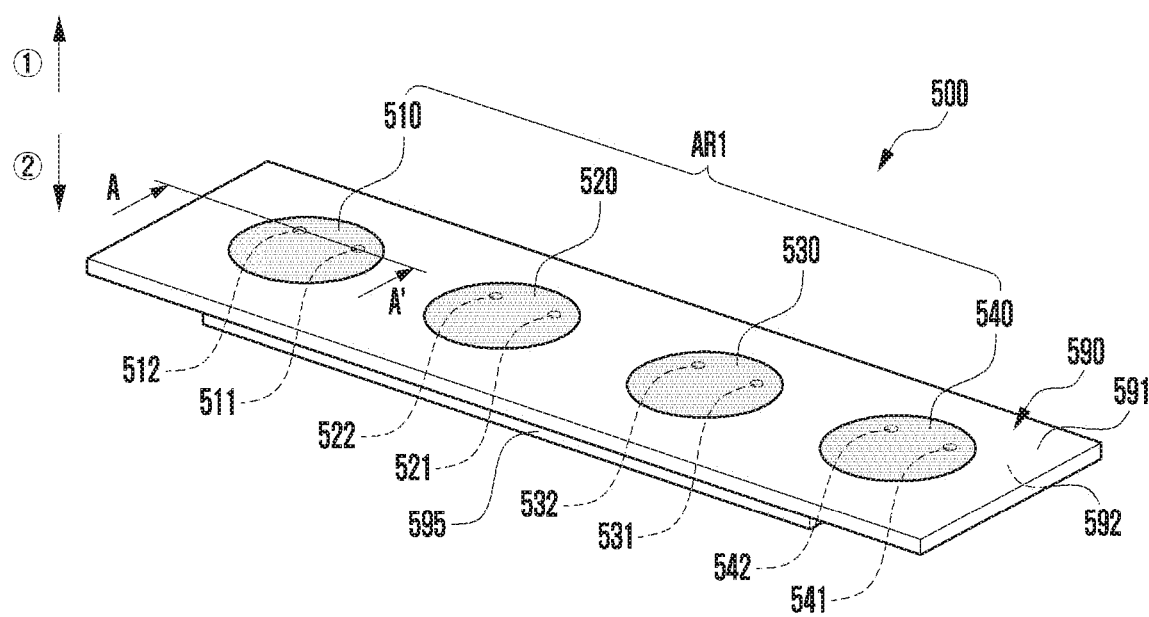
FIG. 5A is a perspective view showing an antenna module according to an embodiment of the disclosure.

FIG. 5A is a perspective view showing an antenna module 500 according to an embodiment of the disclosure.

Figure 5B:
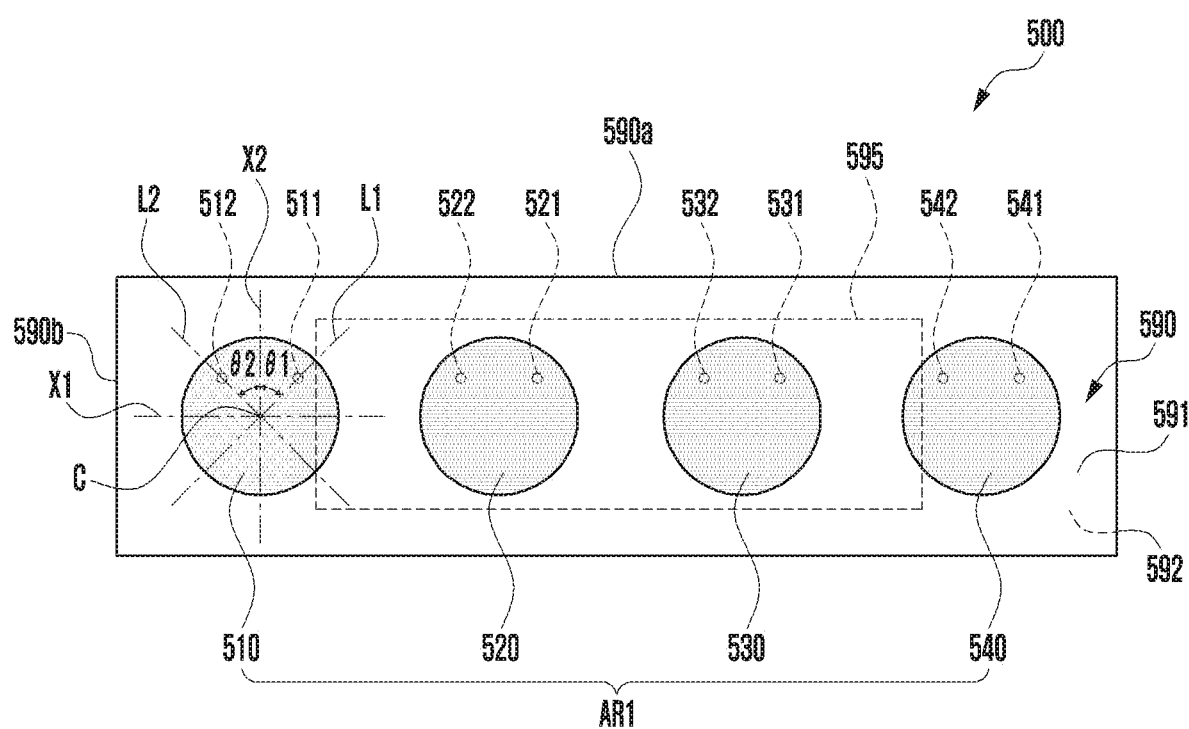
FIG. 5B is a plan view showing the antenna module shown in FIG. 5A according to an embodiment of the disclosure.

FIG. 5B is a plan view showing the antenna module 500 shown in FIG. 5A according to an embodiment of the disclosure.

The antenna module 500 of FIGS. 5A and 5B may be similar, at least in part, to the third antenna module 246 of FIG. 2, or may include other embodiments of the antenna module.

Referring to FIG. 5A, the antenna module 500 may include an antenna array AR1 composed of a plurality of conductive patches 510, 520, 530, and 540. According to an embodiment, the plurality of conductive patches 510, 520, 530, and 540 may be formed on a printed circuit board (PCB) 590. According to an embodiment, the PCB 590 may have a first surface 591 facing a first direction (indicated by □) and a second surface 592 facing a second direction (indicated by □) opposite to the first direction. According to an embodiment, the antenna module 500 may include a wireless communication circuit 595 disposed on the second surface 592 of the PCB 590. According to an embodiment, the plurality of conductive patches 510, 520, 530, and 540 may be electrically connected to the wireless communication circuit 595. According to an embodiment, the wireless communication circuit 595 may be configured to transmit and/or receive a radio frequency signal in the range of about 3 GHz to 100 GHz via the antenna array AR1.

According to various embodiments, the plurality of conductive patches 510, 520, 530, and 540 may include a first conductive patch 510, a second conductive patch 520, a third conductive patch 530, and a fourth conductive patch 540 which are disposed at regular intervals on the first surface 591 of the PCB 590 or near the first surface 591 in the PCB 590. The conductive patches 510, 520, 530, 540 may have the substantially same configuration. Although the antenna module 500 according to an embodiment is illustrated and described as including the antenna array AR1 composed of four conductive patches 510, 520, 530, and 540, this is should not be construed as a limitation. Alternatively, the antenna module 500 may include, as the antenna array AR1, one, two, three, five, or more conductive patches.

According to various embodiments, the antenna module 500 may operate as a dual polarized antenna through feeders disposed in each of the plurality of conductive patches 510, 520, 530, and 540. According to an embodiment, in order to form the dual polarized antenna, each of the conductive patches 510, 520, 530, and 540 may be formed in a symmetrical shape both widthwise and lengthwise. For example, each of the conductive patches 510, 520, 530, and 540 may be formed in a square, circular, or octagonal shape. According to an embodiment, the first conductive patch 510 may include a first feeder 511 and a second feeder 512. According to an embodiment, the second conductive patch 520 may include a third feeder 521 and a fourth feeder 522. According to an embodiment, the third conductive patch 530 may include a fifth feeder 531 and a sixth feeder 532. According to an embodiment, the fourth conductive patch 540 may include a seventh feeder 541 and an eighth feeder 542.

According to various embodiments, the wireless communication circuit 595 may be configured to transmit and/or receive a first signal via a first polarized antenna array composed of the first feeder 511, the third feeder 521, the fifth feeder 531, and/or the seventh feeder 541. According to various embodiments, the wireless communication circuit 595 may be configured to transmit and/or receive a second signal via a second polarized antenna array composed of the second feeder 512, the fourth feeder 522, the sixth feeder 532, and/or the eighth feeder 542. According to an embodiment, the wireless communication circuit 595 may transmit and/or receive the same or different first and second signals in the same frequency band.

Although an arrangement structure of the first and second feeders 511 and 512 disposed in the first conductive patch 510 is shown in detail in FIG. 5B and will be described hereinafter, the feeders 521, 522, 531, 532, 541, and 542 of the other conductive patches 520, 530, and 540 as well may have the substantially same arrangement.

Referring to FIG. 5B, the antenna module 500 may include an antenna structure including the PCB 590 and the conductive patches 510, 520, 530, and 540 disposed on the first surface 591 of the PCB 590. According to an embodiment, in order to accommodate the plurality of conductive patches 510, 520, 530, and 540 spaced apart at regular intervals, the PCB 590 may be formed in a rectangular shape. That is, the PCB 590 may have a first side 590a and a second side 590b shorter in length than the first side 590a.

According to various embodiments, the first conductive patch 510 may include the first feeder 511 for transmitting and/or receiving a first signal, and the second feeder 512 for transmitting and/or receiving a second signal. According to an embodiment, the first feeder 511 and the second feeder 512 may be arranged to express substantially different polarization characteristics in the same operating frequency band. According to an embodiment, the first feeder 511 and the second feeder 512 may be configured to express substantially the same radiation performance in the same frequency band. According to an embodiment, the first conductive patch 510 may have a first virtual axis X1 and a second virtual axis X2. The first virtual axis X1 passes through the center C of the first conductive patch 510 and is substantially parallel to the first side 590a of the PCB 590, and the second virtual axis X2 passes through the center C of the first conductive patch 510 and is substantially parallel to the second side 590b of the PCB 590. According to an embodiment, the first feeder 511 may be disposed on a first virtual line L1 that passes through the center C of the first conductive patch 510 and has a slope of a first angle θ1 (e.g., 45 degrees) with respect to the second virtual axis X2. According to an embodiment, the second feeder 512 may be disposed on a second virtual line L2 that passes through the center C of the first conductive patch 510 and has a slope of a second angle θ2 (e.g., −45 degrees) with respect to the second virtual axis X2. The sum of the first angle θ1 and the second angle θ2 may be substantially 90 degrees. According to various embodiments, the first feeder 511 and the second feeder 512 disposed on the first virtual line L1 and the second virtual line L2, respectively, may be affected by the same size (e.g., area) of the ground (e.g., a ground layer 5903 in FIG. 6) disposed in the rectangular PCB 590, thus exhibiting the substantially same radiation performance.

Figure 6:
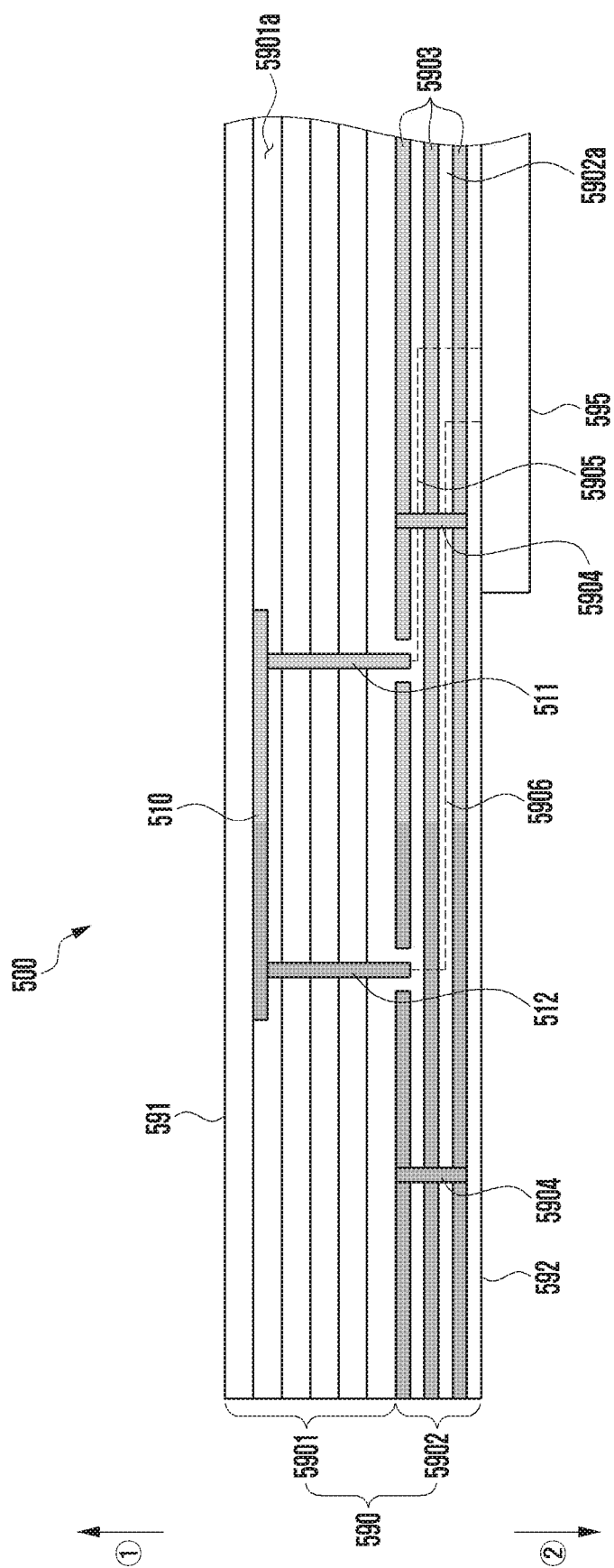
FIG. 6 is a cross-sectional view taken along the line A-A' in FIG. 5A according to an embodiment of the disclosure.

FIG. 6 is a cross-sectional view taken along the line A-A' in FIG. 5A according to an embodiment of the disclosure.

Although an arrangement configuration of the first conductive patch 510 disposed in the PCB 590 of the antenna module 500 is shown in FIG. 6 and will be described hereinafter, each of the second, third, and fourth conductive patches (e.g., 520, 530, and 540 in FIG. 5A) as well may have the substantially same arrangement configuration.

Referring to FIG. 6, the antenna module 500 may include an antenna structure including the PCB 590 and the first conductive patch 510 disposed in the PCB 590. According to an embodiment, the PCB 590 may have the first surface 591 facing the first direction (denoted by ☐) and the second surface 592 facing the second direction (denoted by ☐) opposite to the first direction. According to an embodiment, the PCB 590 may include a plurality of insulating layers. According to an embodiment, the PCB 590 may include a first layer region 5901 having at least one insulating layer, and a second layer region 5902 adjoining the first layer region 5901 and having another at least one insulating layer. According to an embodiment, the antenna module 500 may include the first conductive patch 510 disposed in the first layer region 5901. According to an embodiment, the antenna module 500 may include at least one ground layer 5903 disposed in the second layer region 5902. According to an embodiment, the at least one ground layer 5603 may be electrically connected to each other through at least one conductive via 5904 in the second layer region 5902. In another embodiment, the antenna module 500 may include another ground layer disposed in the first layer region 5901 and insulated from the first conductive patch 510.

According to various embodiments, the first conductive patch 510 may be disposed on a first insulating layer 5901a closer to the first surface 591 than the second surface 592 in the first layer region 5901. According to an embodiment, the first conductive patch 510 may be disposed close to the first surface 591 in the first layer region 5901. In another embodiment, the first conductive patch 510 may be disposed to be exposed to the first surface 591 in the first layer region 5901.

According to various embodiments, the first conductive patch 510 may include, as described above, the first feeder 511 and the second feeder 512 which are disposed on virtual lines (e.g., the first virtual line L1 and the second virtual line L2 in FIG. 5B) each having a slope of a certain angle (e.g., an acute angle) with respect to the second virtual axis (e.g., the second axis X2 in FIG. 5B) passing through the center (e.g., the center C in FIG. 5B) of the first conductive patch 510. According to an embodiment, such virtual lines (e.g., the first virtual line L1 and the second virtual line L2 in FIG.

5B) may be arranged to be orthogonal to each other in terms of dual polarization. According to an embodiment, each of the first feeder 511 and the second feeder 512 may include a conductive via disposed to penetrate the first layer region 5901 in a thickness direction of the PCB 590. According to an embodiment, the first feeder 511 may be electrically connected to the wireless communication circuit 595 through a first feed line 5905 disposed in the second layer region 5902. According to an embodiment, the second feeder 512 may be electrically connected to the wireless communication circuit 595 through a second feed line 5906 disposed in the second layer region 5902. According to an embodiment, the first feed line 5905 and/or the second feed line 5906 may be electrically isolated from the ground layer 5603 disposed on a second insulating layer 5402a in the second layer region 5902. In another embodiment, the first conductive patch 510 may be fed through coupling by being capacitively coupled to a feeding pad disposed in the first layer region 5901.

Figure 7A:
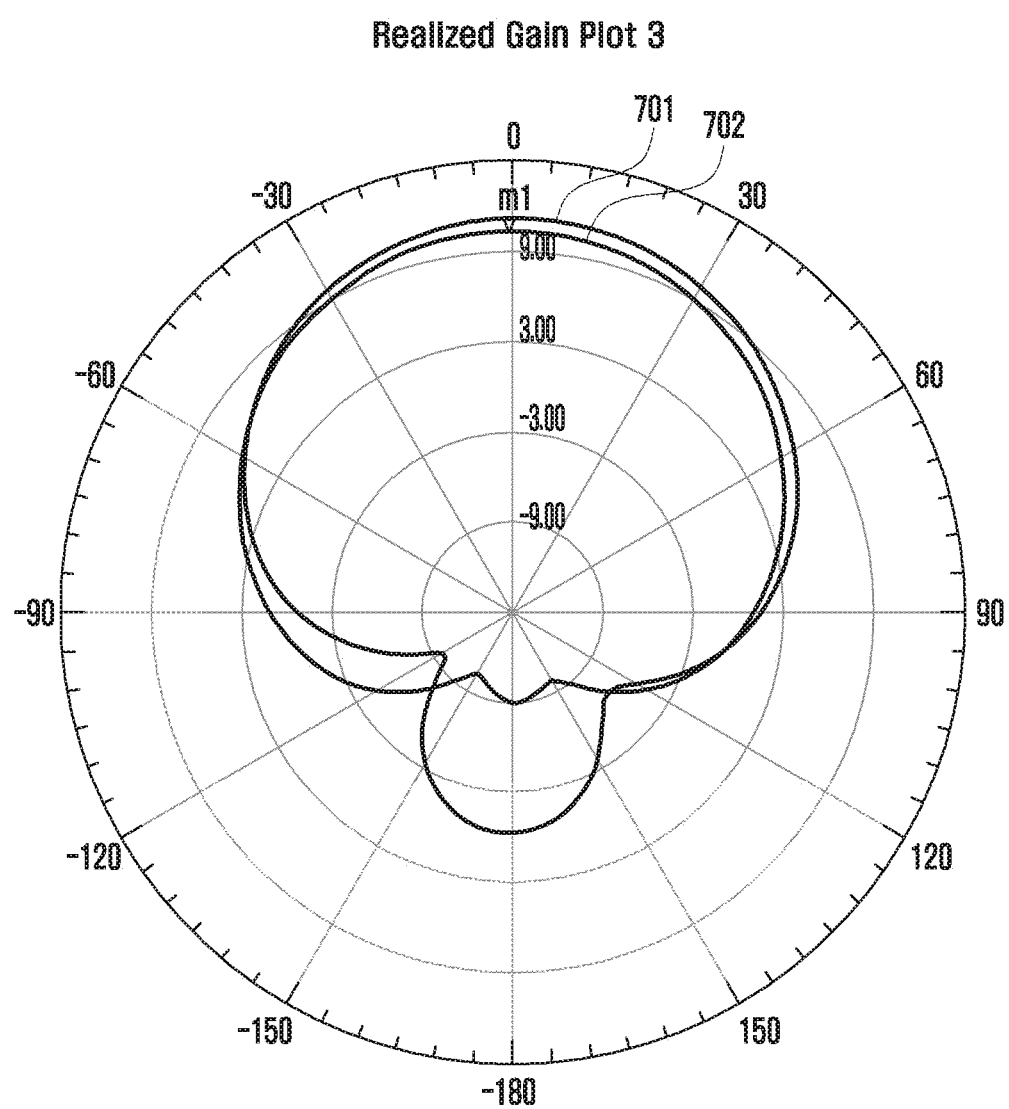
FIGS. 7A and 7B are diagrams comparing radiation characteristics before and after a change in arrangement of two feeders of an antenna module according to various embodiments of the disclosure.
Figure 7B:
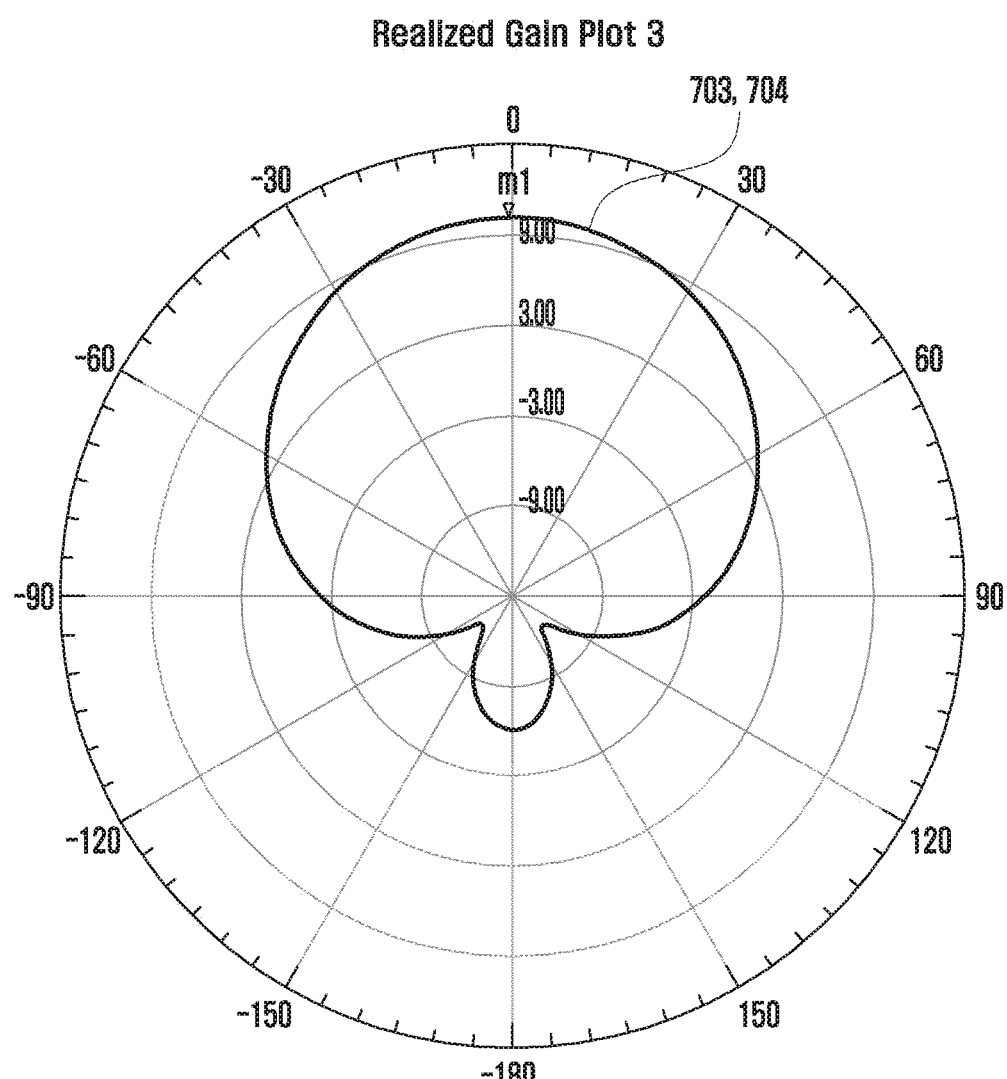

FIGS. 7A and 7B are diagrams comparing radiation characteristics before and after a change in arrangement of two feeders of an antenna module according to various embodiments of the disclosure.

Referring to FIGS. 7A and 7B, FIG. 7A shows the radiation characteristics before a change in arrangement of two feeders of an antenna module, and FIG. 7B shows the radiation characteristics after a change in arrangement of two feeders of an antenna module.

Typically, one of a pair of feeders may be disposed on a first axis (e.g., the first axis X1 in FIG. 5B) of a PCB (e.g., the PCB 590 in FIG. 5B), and the other feeder may be disposed on a second axis (e.g., the second axis X2 in FIG. 5B) of the PCB. In this case, as shown in FIG. 7A, a difference of about 0.8 dB may be caused between a gain (about 11.1 dB) by one feeder having a radiation pattern 701 and a gain (about 10.3 dB) by the other feeder having a radiation pattern 702.

In contrast, according to the above-discussed embodiment, one of a pair of feeders (e.g., the first feeder 511, the third feeder 521, the fifth feeder 531, or the seventh feeder 541 in FIG. 5B) may be disposed on a first virtual line (e.g., the first virtual line L1 in FIG. 5B) having a slope of 45 degrees with respect to a second axis (e.g., the second axis X2 in FIG. 5B) that passes through the center (e.g., the center C in FIG. 5B) of a conductive patch (e.g., the first conductive patch 510 in FIG. 5B), and the other feeder (e.g., the second feeder 512, the fourth feeder 522, the sixth feeder 532, or the eighth feeder 542 in FIG. 5B) may be disposed on a second virtual line (e.g., the second virtual line L2 in FIG. 5B) having a slope of −45 degrees with respect to the second axis. In this case, as shown in FIG. 7B, a gain by one feeder having a radiation pattern 703 and a gain by the other feeder having a radiation pattern 704 have the substantially same value (e.g., about 10.68 dB). This means that the radiation performance of feeders 511, 521, 531, 541, 512, 522, 532, and 542 having different polarization characteristics are the same.

FIGS. 8A to 8D are plan views showing antenna modules 810, 820, 830, and 840 having various arrangements of feeders according to various embodiments of the disclosure.

Each of the antenna modules 810, 820, 830, and 840 shown in FIGS. 8A to 8D may be similar, at least in part, to the third antenna module 246 of FIG. 2, or may include other embodiments of the antenna module.

According to various embodiments, at least one of conductive patches may include feeders disposed at different positions on a first virtual line L1 (e.g., the first virtual line L1 in FIG. 5B) and a second virtual line L2 (e.g., the second virtual line L2 in FIG. 5B).

Figure 8A:
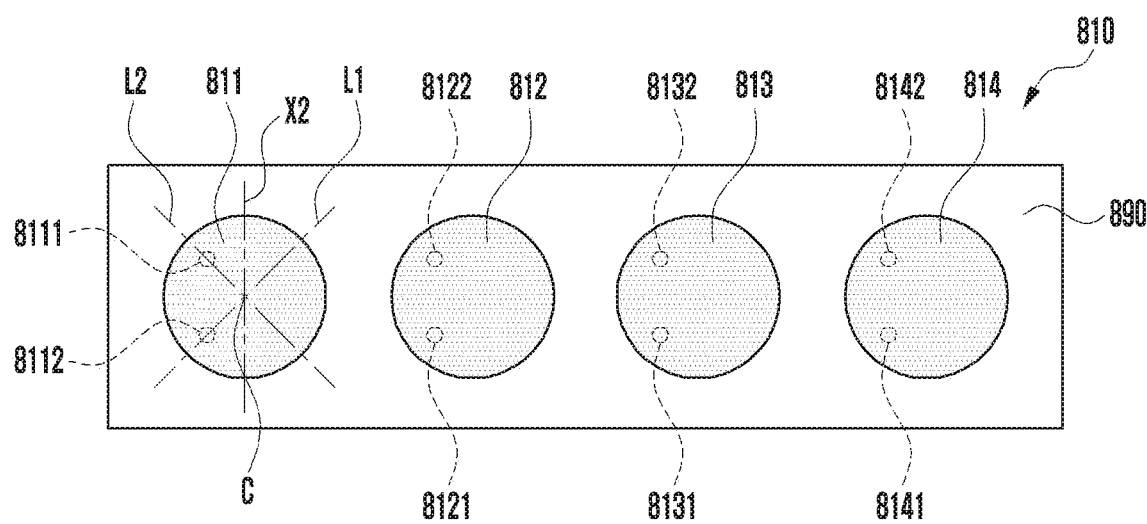
FIGS. 8A, 8B, 8C and 8D are plan views showing antenna modules having various arrangements of feeders according to various embodiments of the disclosure.

Referring to FIG. 8A, the antenna module 810 may include a PCB 890 (e.g., the PCB 590 in FIG. 5B) and conductive patches 811, 812, 813, and 814 disposed on the PCB 890. According to an embodiment, the conductive patches 811, 812, 813, and 814 are disposed at regular intervals, and may include a first conductive patch 811 having a first feeder 8111 and a second feeder 8112, a second conductive patch 812 having a third feeder 8121 and a fourth feeder 8122, a third conductive patch 813 having a fifth feeder 8131 and a sixth feeder 8132, and a fourth conductive patch 814 having a seventh feeder 8141 and an eighth feeder 8142.

According to various embodiments, the first conductive patch 811 may include the first feeder 8111 and the second feeder 8112 disposed on the first virtual line L1 and the second virtual line L2, respectively. According to an embodiment, both the first feeder 8111 and the second feeder 8112 may be disposed in a first area (e.g., a left area) with respect to a second axis X2 (e.g., the second axis X2 in FIG. 5B) passing through the center C of the first conductive patch 811. According to an embodiment, the other conductive patches 812, 813, and 814 as well may include feeders 8121, 8122, 8131, 8132, 8141, and 8142 disposed in the substantially same manner.

Figure 8B:
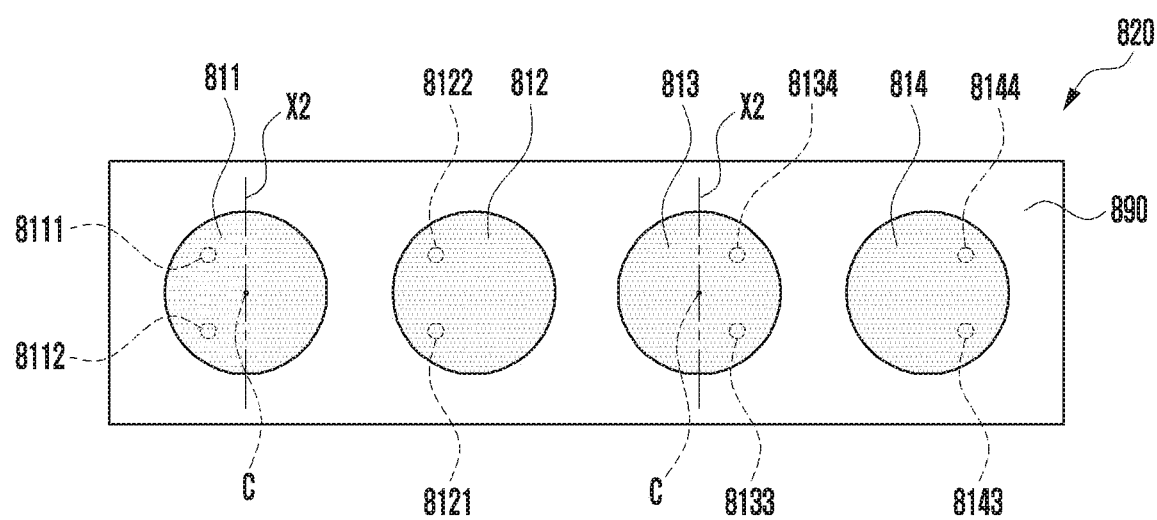

Referring to FIG. 8B, the antenna module 820 may include the first and second conductive patches 811 and 812 having feeders 8111, 8112, 8121, and 8122 all of which are disposed in the first area with respect to the second axis X2. According to an embodiment, the antenna module 820 may further include the third and fourth conductive patches 813 and 814 having feeders 8133, 8134, 8143, and 8144 all of which are disposed in a second area (e.g., a right area) opposite to the first area with respect to the second axis X2.

Figure 8C:
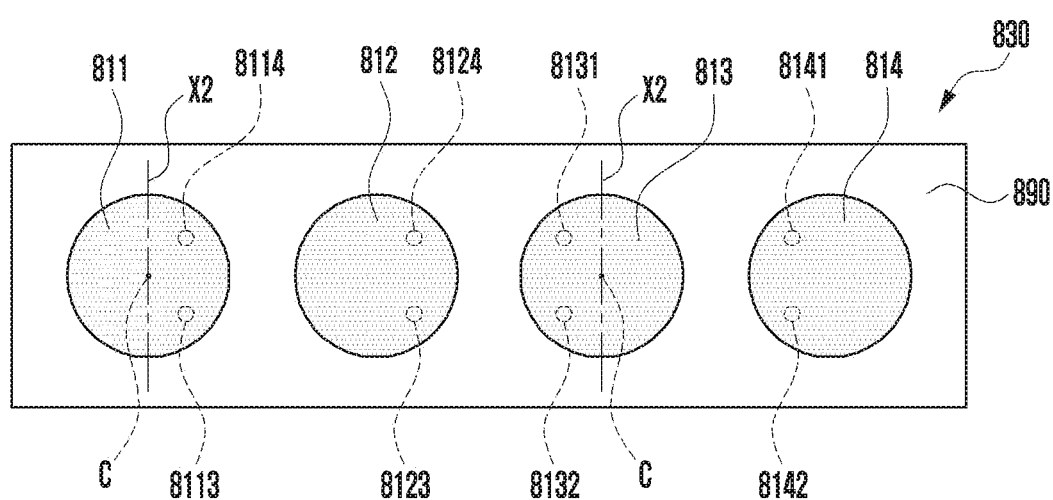

Referring to FIG. 8C, the antenna module 830 may include the first and second conductive patches 811 and 812 having feeders 8113, 8114, 8123, and 8124 all of which are disposed in the second area with respect to the second axis X2. According to an embodiment, the antenna module 830 may further include the third and fourth conductive patches 813 and 814 having feeders 8131, 8132, 8141, and 8142 all of which are disposed in the first area with respect to the second axis X2.

Figure 8D:
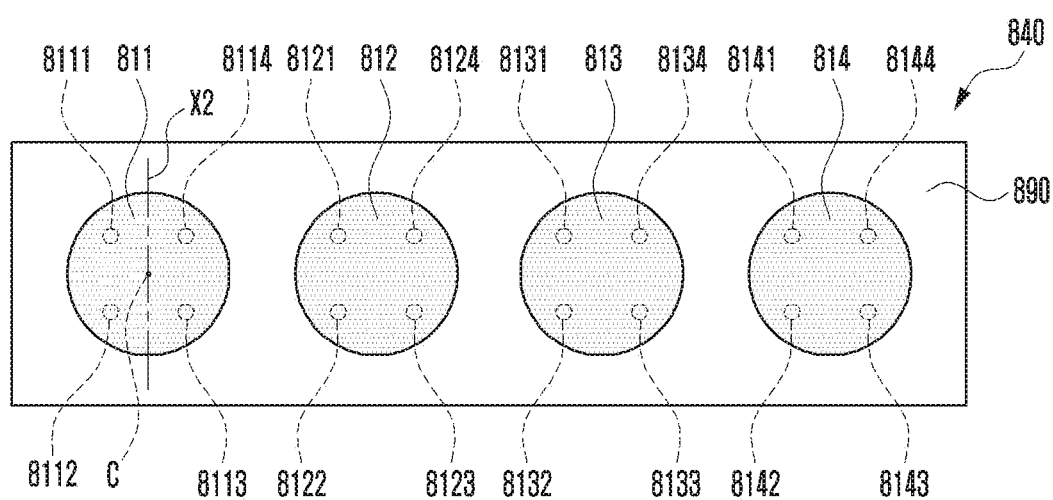

Referring to FIG. 8D, the antenna module 840 may include conductive patches 811, 812, 813, and 814 each having four feeders 8111, 8112, 8113, and 8114; 8121, 8122, 8123, and 8124; 8131, 8132, 8133, and 8134; or 8141, 8142, 8143, and 8144 for dual polarized dual feeding. In this case, the first conductive patch 811 may include a pair of feeders 8111 and 8112 disposed in the first area with respect to the second axis X2, and also include another pair of feeders 8131 and 8114 disposed in the second area with respect to the second axis X2. According to an embodiment, the other conductive patches 812, 813, and 814 as well may include feeders 8121, 8122, 8123, 8124, 8131, 8132, 8133, 8134, 8141, 8142, 8143, and 8144 disposed in the substantially same manner.

According to various embodiments, positions of the feeders disposed on the virtual lines L1 and L2 in the conductive patch may be determined by considering a port configuration of a wireless communication circuit (e.g., the wireless communication circuit 595 in FIG. 5B) mounted below the PCB 890 or considering an arrangement structure of the antenna module in an electronic device.

Figure 9:
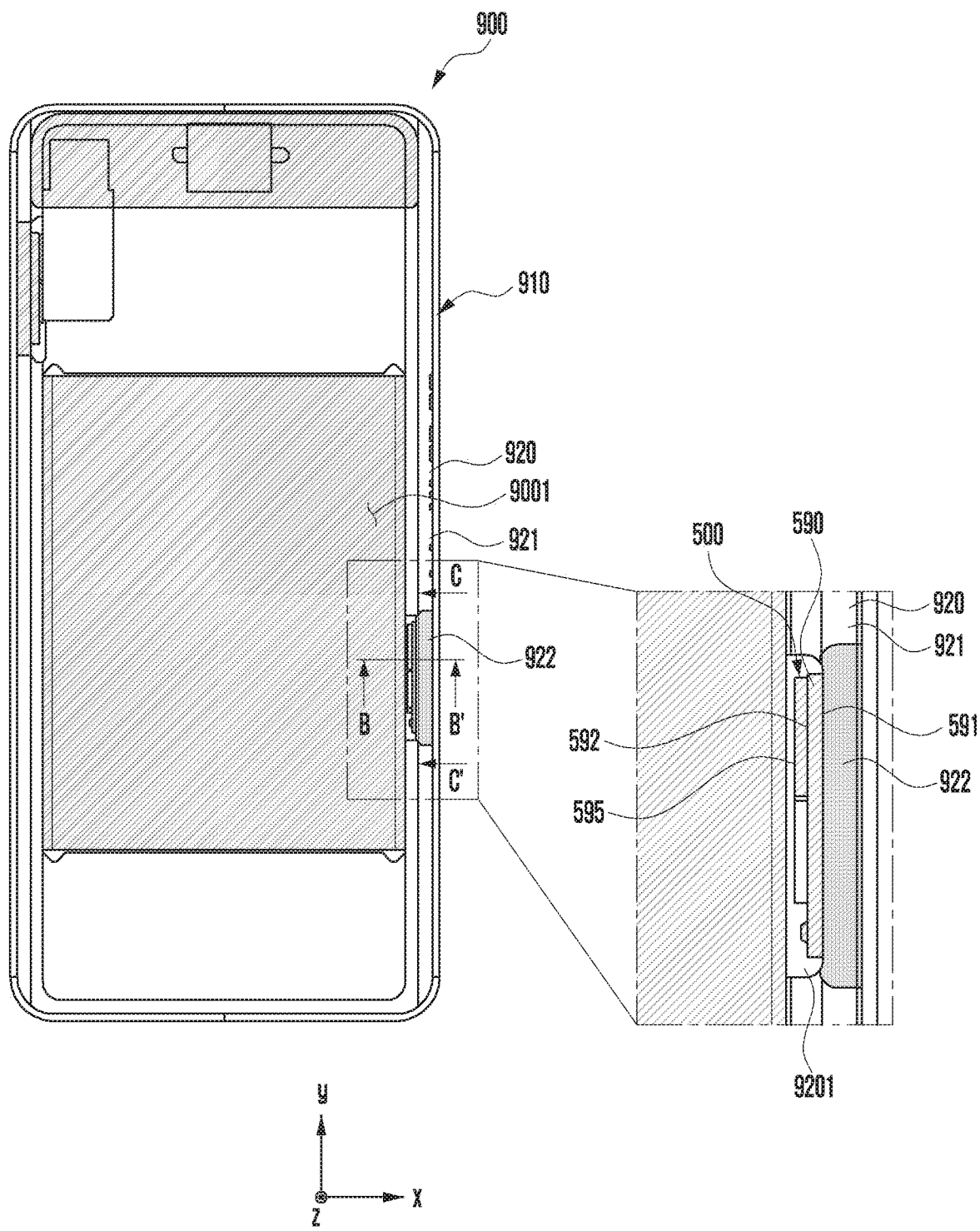
FIG. 9 is a diagram illustrating an electronic device where an antenna module is mounted according to an embodiment of the disclosure.

FIG. 9 is a diagram illustrating an electronic device 900 where an antenna module 500 is mounted according to an embodiment of the disclosure.

The electronic device 900 of FIG. 9 may be similar, at least in part, to the electronic device 300 of FIG. 3A or the electronic device 320 of FIG. 3C, or may include other embodiments of the electronic device.

Referring to FIG. 9, the electronic device 900 may include a housing 910 that includes a front plate (e.g., a front plate 930 in FIG. 10A) facing a first direction (e.g., the −Z direction in FIG. 10A), a rear plate (e.g., a rear plate 940 in FIG. 10A) facing a second direction (e.g., the Z direction in FIG. 10A) opposite to the first direction, and a lateral member 920 surrounding an inner space 9001 between the front plate 930 and the rear plate 940. According to an embodiment, the lateral member 920 may include a conductive portion 921 disposed at least in part and a polymer portion 922 (i.e., a non-conductive portion) insert-injected into the conductive portion 921. In another embodiment, the polymer portion 922 may be replaced with a space or any other dielectric material.

According to various embodiments, the antenna module 500 may be mounted in the inner space 9001 of the electronic device 900 such that conductive patches (e.g., the conductive patches 510, 520, 530, and 540 in FIG. 10B) face the lateral member 920. For example, the antenna module 500 may be mounted into a module mounting portion 9201 provided in the lateral member 920 such that the first surface 591 of the PCB 590 faces the lateral member 920. According to an embodiment, at least a portion of the lateral member 920 facing the antenna module 500 may be formed as the polymer portion 922 such that a beam pattern is formed in a direction of the lateral member 920.

Figure 10A:
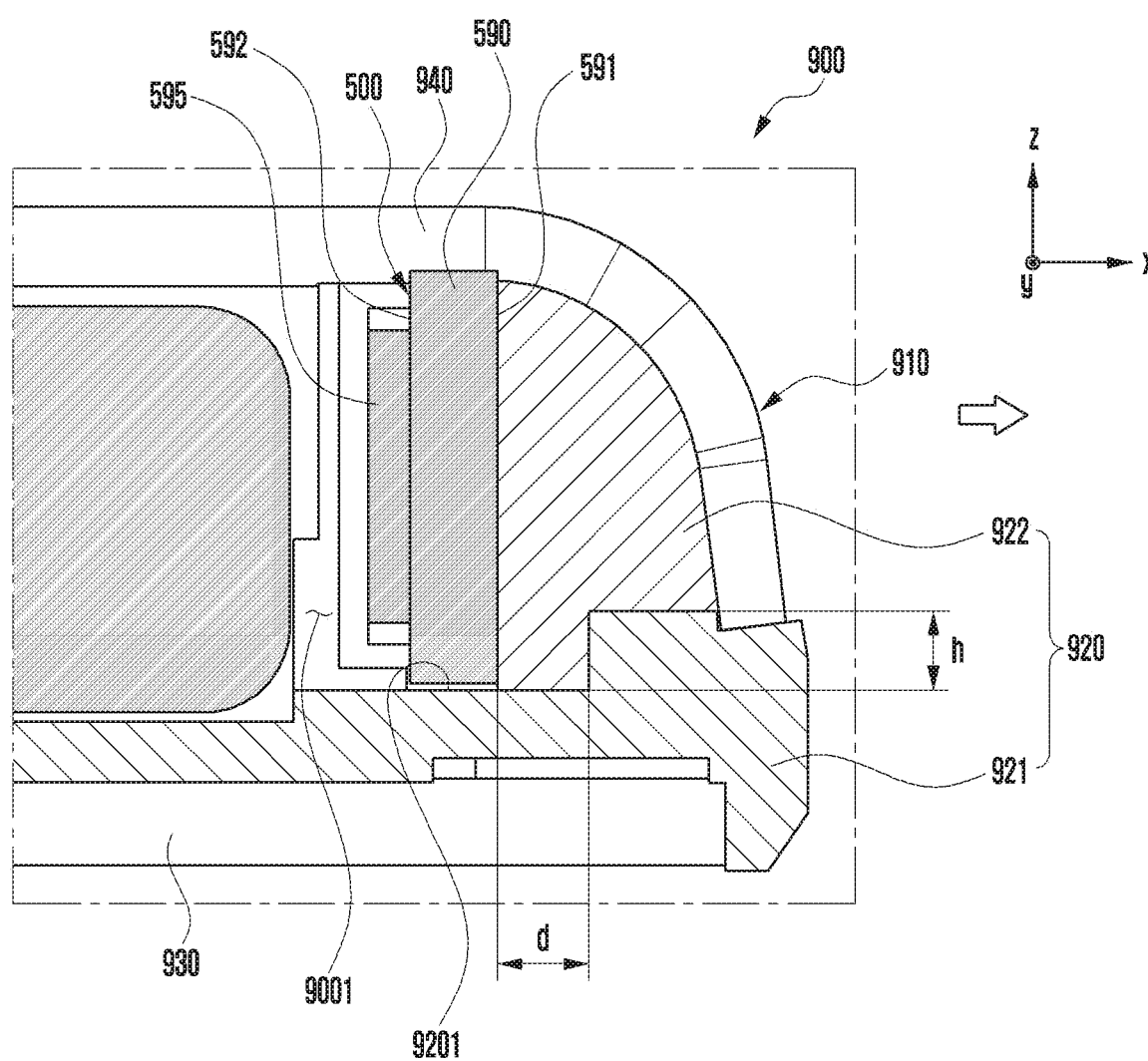
FIG. 10A is a cross-sectional view taken along the line B-B' in FIG. 9 according to an embodiment of the disclosure.
Figure 10B:
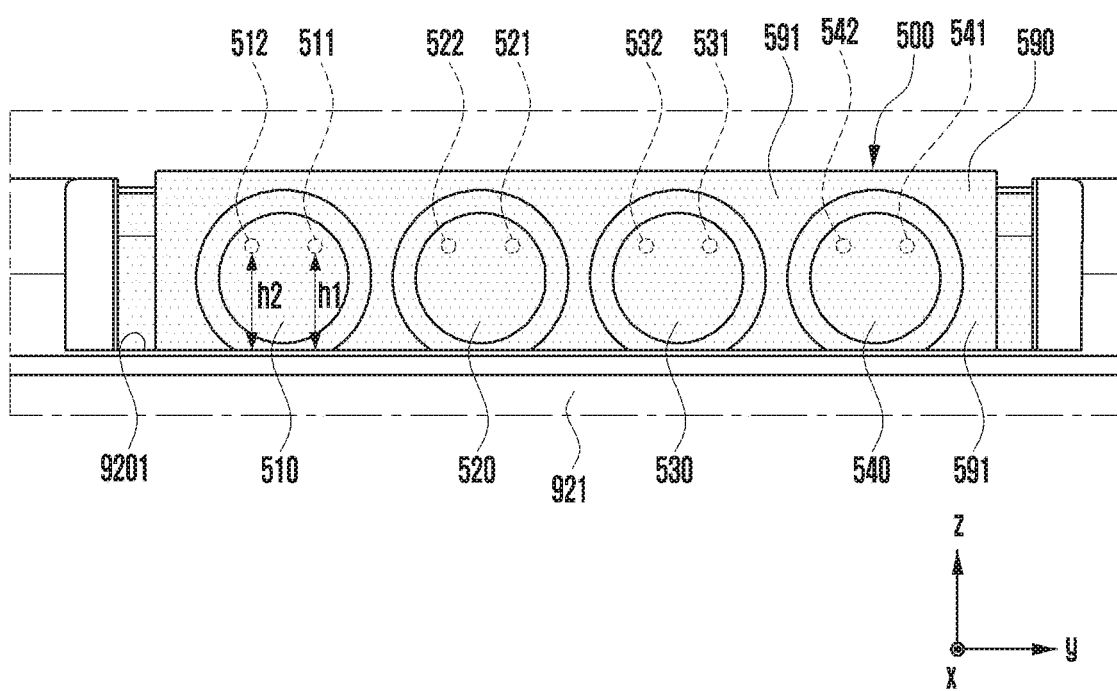
FIG. 10B is a cross-sectional view taken along the line C-C' in FIG. 9 according to an embodiment of the disclosure.

FIG. 10A is a cross-sectional view taken along the line B-B' in FIG. 9, according to an embodiment of the disclosure and FIG. 10B is a cross-sectional view taken along the line C-C' in FIG. 9 according to an embodiment of the disclosure. In particular, FIG. 10B shows the antenna module 500 seen from the outside of the lateral member 920 with the polymer portion 922 removed.

Referring to FIGS. 10A and 10B, the PCB 590 of the antenna module 500 may be mounted in the module mounting portion 9201 of the lateral member 920 so as to overlap, at least in part, with the conductive portion 921 when the lateral member 920 is viewed from the outside. This may prevent an increase in thickness of the electronic device 900 due to the mounting of the PCB 590 and also allow the PCB 590 to be firmly mounted to the lateral member 920.

According to various embodiments, the radiation characteristics of the antenna module 500 may vary according to a separation distance (d) from the conductive portion 921 and/or an overlap height (h) with the conductive portion 921. According to an embodiment, even if the radiation characteristics of the antenna module 500 vary according to the separation distance (d) and/or the overlap height (h), the radiation performance by the feeders 511, 512, 521, 522, 531, 532, 541, and 542 of the conductive patches 510, 520, 530, and 540 may be unvaried substantially.

According to various embodiments, when the lateral member 920 is viewed from the outside, at least a part of the PCB 590 may be disposed to overlap with the conductive portion 921. According to an embodiment, when the lateral member 920 is viewed from the outside, the conductive patches 510, 520, 530, and 540 of the antenna module 500 may be disposed so as not to overlap with the conductive portion 921. In another embodiment, when the lateral member 920 is viewed from the outside, the conductive patches 510, 520, 530, and 540 of the antenna module 500 may be disposed to at least partially overlap with the conductive portion 921. In this case, when the lateral member 920 is viewed from the outside, the feeders 511, 512, 521, 522, 531, 532, 541, and 542 may be disposed at positions that do not overlap with the conductive portion 921.

According to various embodiments, as described above, the first and second feeders 511 and 512 of the first conductive patch 510 may be disposed on the first virtual line (e.g., the first virtual line L1 in FIG. 5B) and the second virtual line (e.g., the second virtual line L2 in FIG. 5B) in the first conductive patch 510. According to an embodiment, in order to realize the substantially same radiation performance of the antenna module 500, the first and second feeders 511 and 512 may be disposed such that a first vertical distance (h1) between the first feeder 511 and the conductive portion 921 is substantially equal to a second vertical distance (h2) between the second feeder 512 and the conductive portion 921. According to an embodiment, the feeders 521, 522, 531, 532, 541, and 542 disposed in the other conductive patches 520, 530, and 540 may have the substantially same arrangement structure.

Figure 11A:
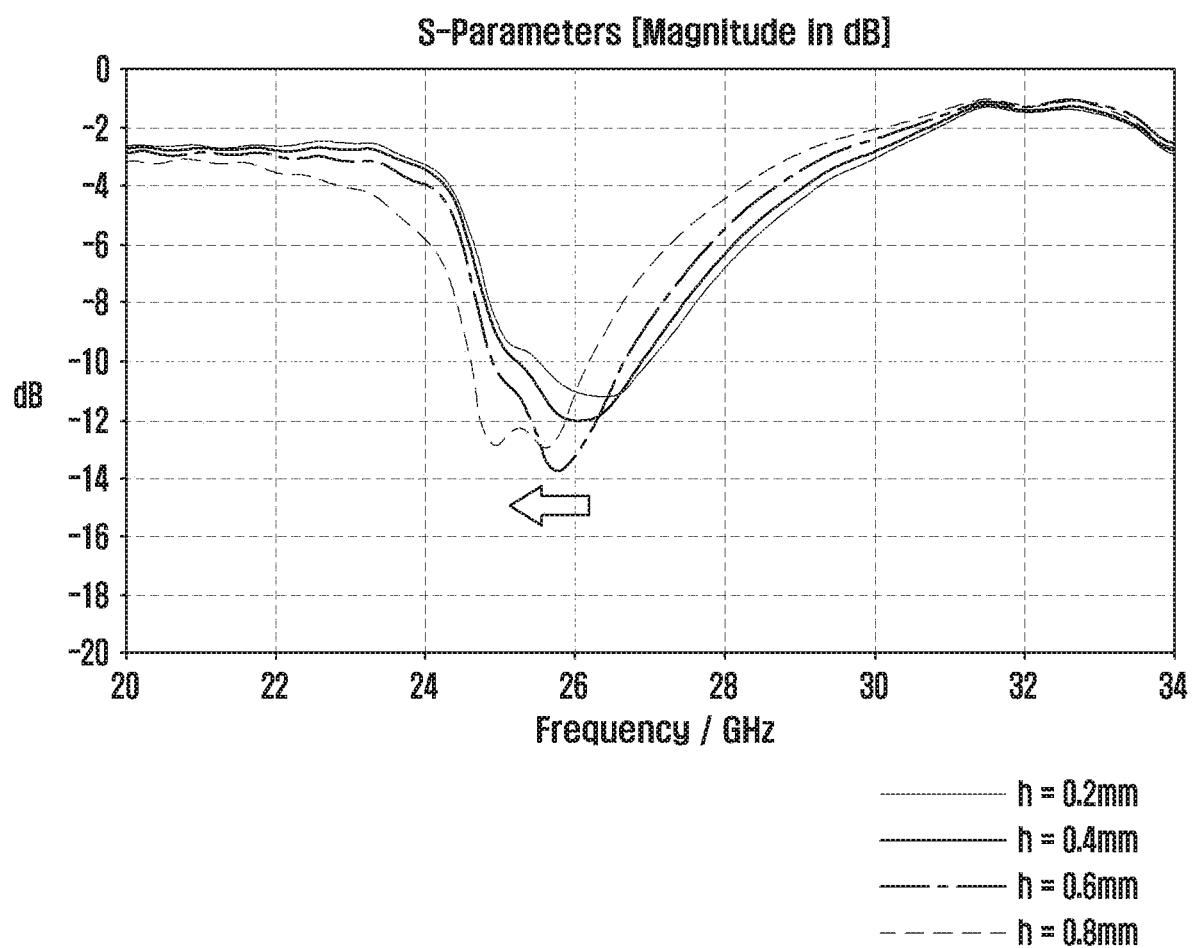
FIGS. 11A and 11B are graphs showing reflection loss characteristics of two feeders of an antenna module in accordance with changes in an overlap height between the conductive portion and the antenna module shown in FIG. 10A according to various embodiments of the disclosure.
Figure 11B:
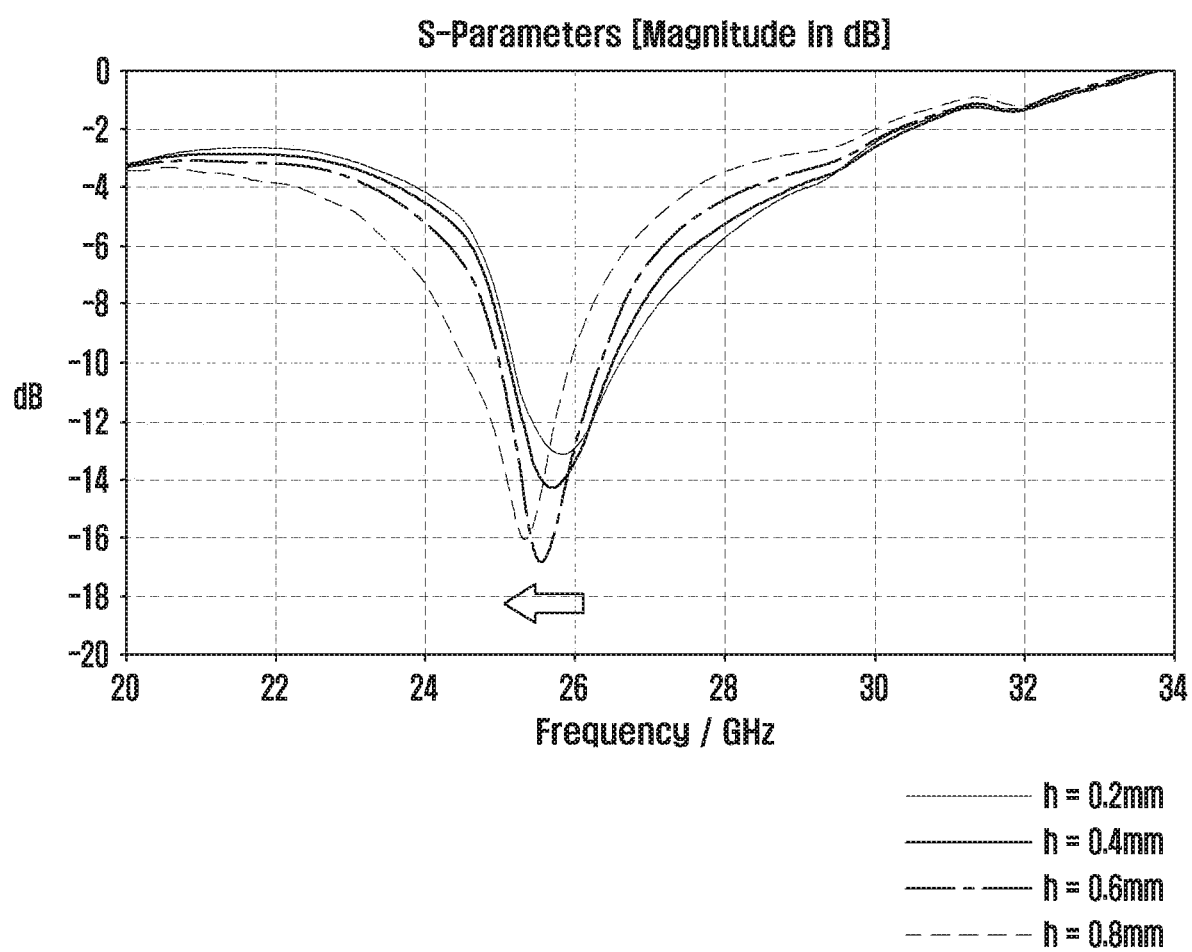

FIGS. 11A and 11B are graphs showing reflection loss characteristics of two feeders (e.g., the first feeder 511 and the second feeder 512 in FIG. 10B) of an antenna module 500 in accordance with changes in an overlap height (h) between the conductive portion 921 and the antenna module 500 shown in FIG. 10A according to various embodiments of the disclosure.

Referring to FIGS. 11A and 11B, as the overlap height (e.g., the overlap height (h) in FIG. 10A) between the PCB (e.g., the PCB 590 in FIG. 10A) and the conductive portion (e.g., the conductive portion 921 in FIG. 10A) increases when the lateral member (e.g., the lateral member 920 in FIG. 10A) is viewed from the outside, each operating frequency band of two feeders is shifted to a low frequency band. This may mean that, even if the overlap height (h) is changed, the radiation performance does not change rapidly at either of two feeders. That is, both feeders 511 and 512 may have the substantially same radiation performance.

Figure 12A:
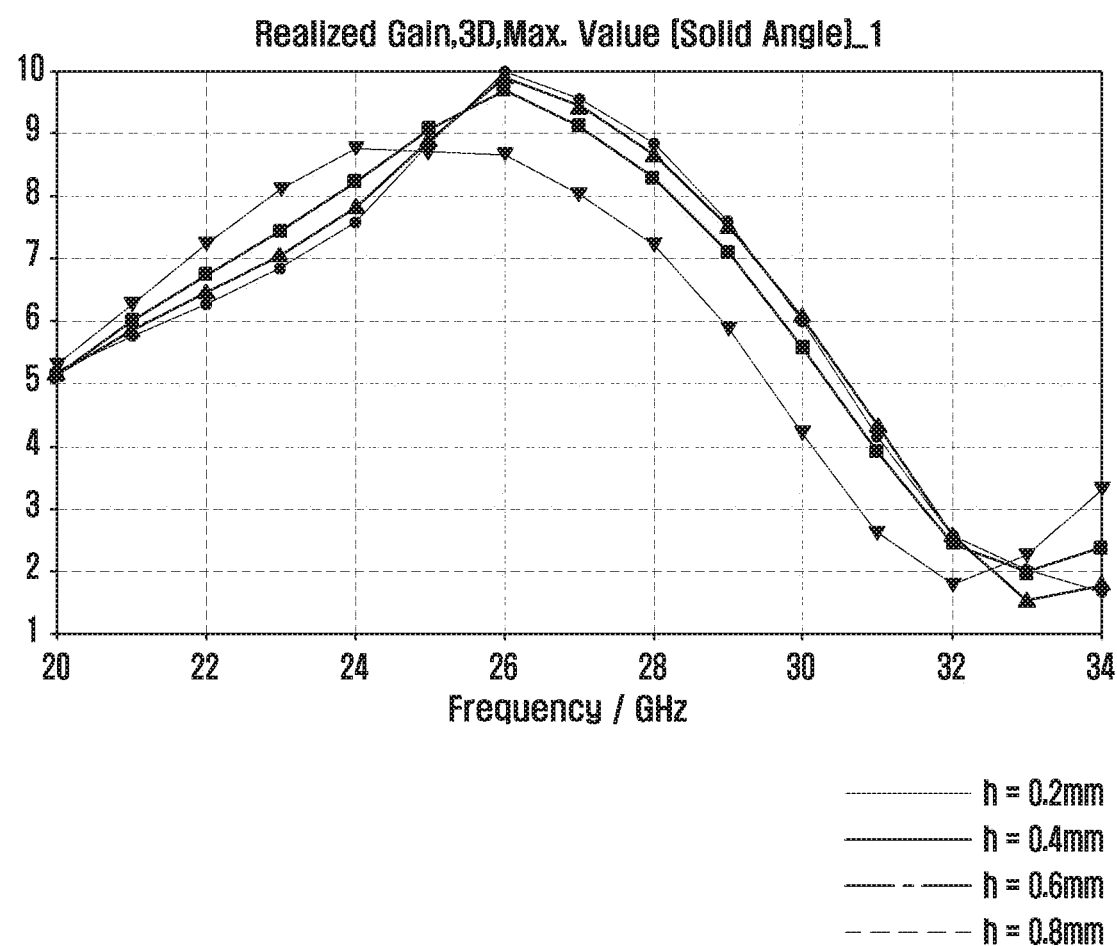
FIGS. 12A and 12B are graphs showing gain characteristics of two feeders of an antenna module in accordance with changes in an overlap height between the conductive portion and the antenna module shown in FIG. 10A according to various embodiments of the disclosure.
Figure 12B:
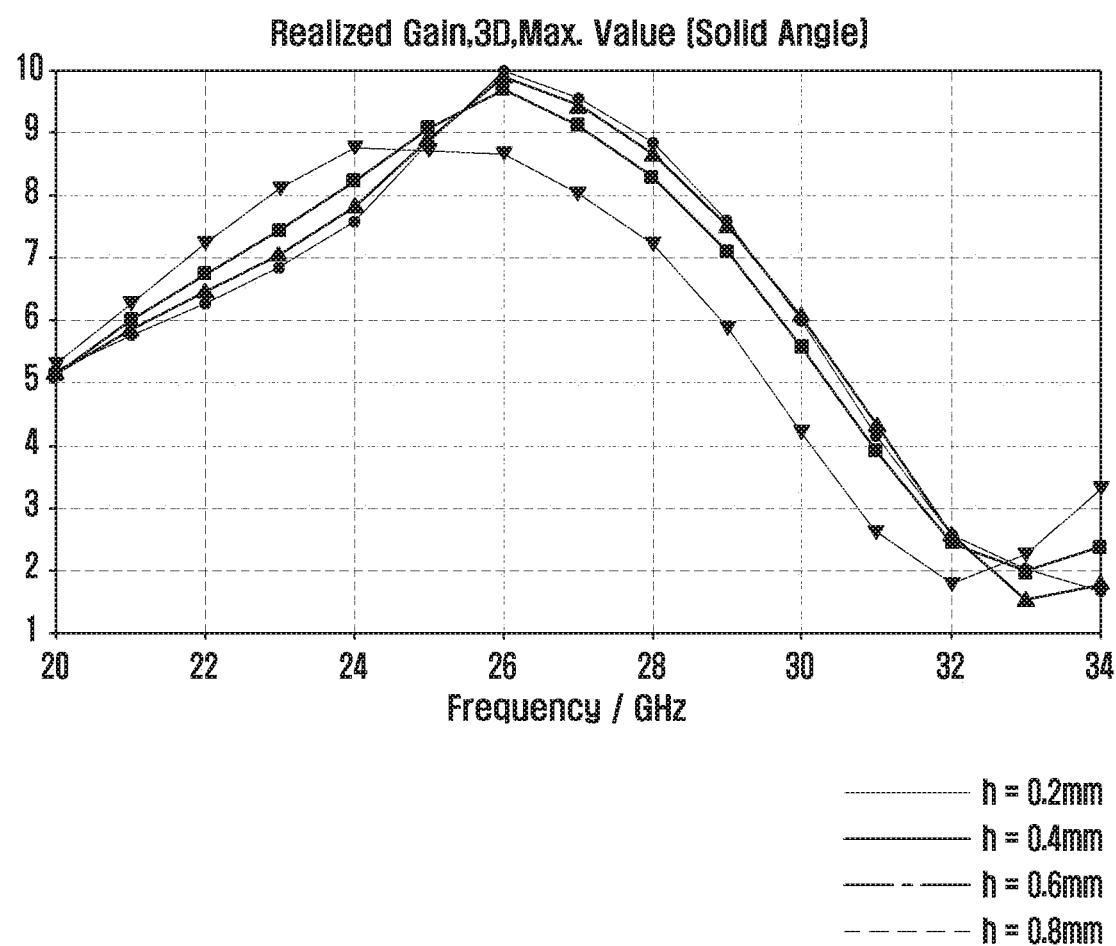

FIGS. 12A and 12B are graphs showing gain characteristics of two feeders (e.g., the first feeder 511 and the second feeder 512 in FIG. 10B) of an antenna module 500 in accordance with changes in an overlap height (h) between the conductive portion 921 and the antenna module 500 shown in FIG. 10A according to various embodiments of the disclosure. Referring to FIGS. 12A and 12B, FIG. 12A shows variations in a gain of a first polarized antenna through feeders (e.g., the feeders 511, 521, 531, and 541 in FIG. 10B) configured to transmit and/or receive a first signal, and FIG. 12B shows variations in a gain of a second polarized antenna through feeders (e.g., the feeders 512, 522, 532, and 542 in FIG. 10B) configured to transmit and/or receive a second signal.

Referring to FIGS. 12A and 12B, as the overlap height (h) between the PCB 590 and the conductive portion 921 increases when the lateral member 920 is viewed from the outside, each gain of two feeders 511 and 512 may change somewhat (i.e., return loss). However, because the same gain change occurs at both feeders 511 and 512, the feeders 511 and 512 may have the substantially same radiation performance.

FIGS. 13A and 13B are tables showing gain characteristics of two feeders 511 and 512 of an antenna module 500 in accordance with changes in an overlap height (h) and a separation distance (d) between the conductive portion 921 and the antenna module 500 shown in FIG. 10A according to various embodiments of the disclosure. Referring to FIGS. 13A and 13B, 13A shows variations in a gain of a first polarized antenna through feeders (e.g., the feeders 511, 521, 531, and 541 in FIG. 10B) configured to transmit and/or receive a first signal, and FIG. 13B shows variations in a gain of a second polarized antenna through feeders (e.g., the feeders 512, 522, 532, and 542 in FIG. 10B) configured to transmit and/or receive a second signal.

Referring to FIGS. 13A and 13B, as the overlap height (h) and the separation distance (d) between the PCB 590 and the conductive portion 921 are changed, a gain change that increases or decreases in a corresponding section has also the same pattern at two feeders 511 and 512. This may mean that both feeders 511 and 512 may have the substantially same radiation performance.

Figure 14:
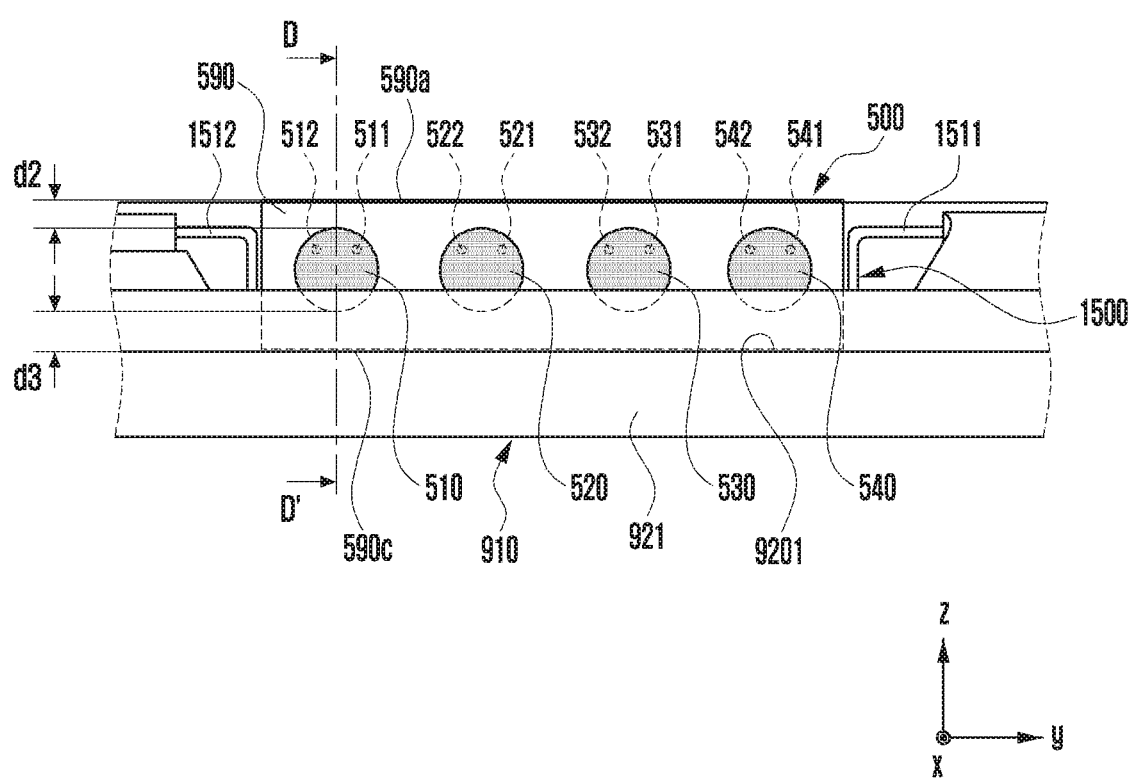
FIG. 14 is a partial cross-sectional view showing a state in which an antenna module is fixed to a lateral member of an electronic device according to an embodiment of the disclosure.

FIG. 14 is a partial cross-sectional view showing a state in which an antenna module 500 is fixed to a lateral member 920 of an electronic device 900 according to an embodiment of the disclosure.

Referring to FIG. 14, the electronic device 900 may include the antenna module 500 disposed on at least a part of the lateral member 920. According to an embodiment, the antenna module 500 may include the PCB 590 and a plurality of conductive patches 510, 520, 530, and 540 disposed on the PCB 590. According to an embodiment, the PCB 590 may be disposed such that the first surface 591 on which the conductive patches 510, 520, 530, and 540 are disposed faces the lateral member 920. According to an embodiment, the conductive patches 510, 520, 530, and 540 may be disposed at regular intervals along the length direction of the rectangular PCB 590 and may include the first conductive patch 510 having the first feeder 511 and the second feeder 512, the second conductive patch 520 having the third feeder 521 and the fourth feeder 522, the third conductive patch 530 having the fifth feeder 531 and the sixth feeder 532, and the fourth conductive patch 540 having the seventh feeder 541 and the eighth feeder 542.

According to various embodiments, the PCB 590 of the antenna module 500 may be disposed to at least partially overlap with the conductive portion 921 when the lateral member 920 is viewed from the outside. Thus, it may be advantageous for the conductive patches 510, 520, 530, 540 to be disposed away from the conductive portion 921. According to an embodiment, the first conductive patch 510 may be disposed eccentrically in a vertical direction (e.g., in a direction of the second axis X2 in FIG. 5B) on the first surface 591 of the PCB 590. For example, the first conductive patch 510 may be disposed such that a first distance (d2) to a first side 590*a* of the PCB 590 is shorter than a second distance (d3) to a third side 590*c* of the PCB 590. Therefore, even if the lateral member 920 and the first side 590*a* are disposed in parallel with each other, the antenna module 500 may be disposed relatively far from the conductive portion 921 without requiring an increase in area of the PCB 590. According to an embodiment, the other conductive patches 520, 530, and 540 as well may have the substantially same arrangement structure as that of the first conductive patch 510. In another embodiment, at least one of the conductive patches 510, 520, 530, and 540 may have an arrangement structure being different from that of the other(s) in a vertical direction (e.g., a direction of the second axis X2 in FIG. 5B) depending on the shape of the conductive portion 921 of the lateral member 920.

Figure 15A:
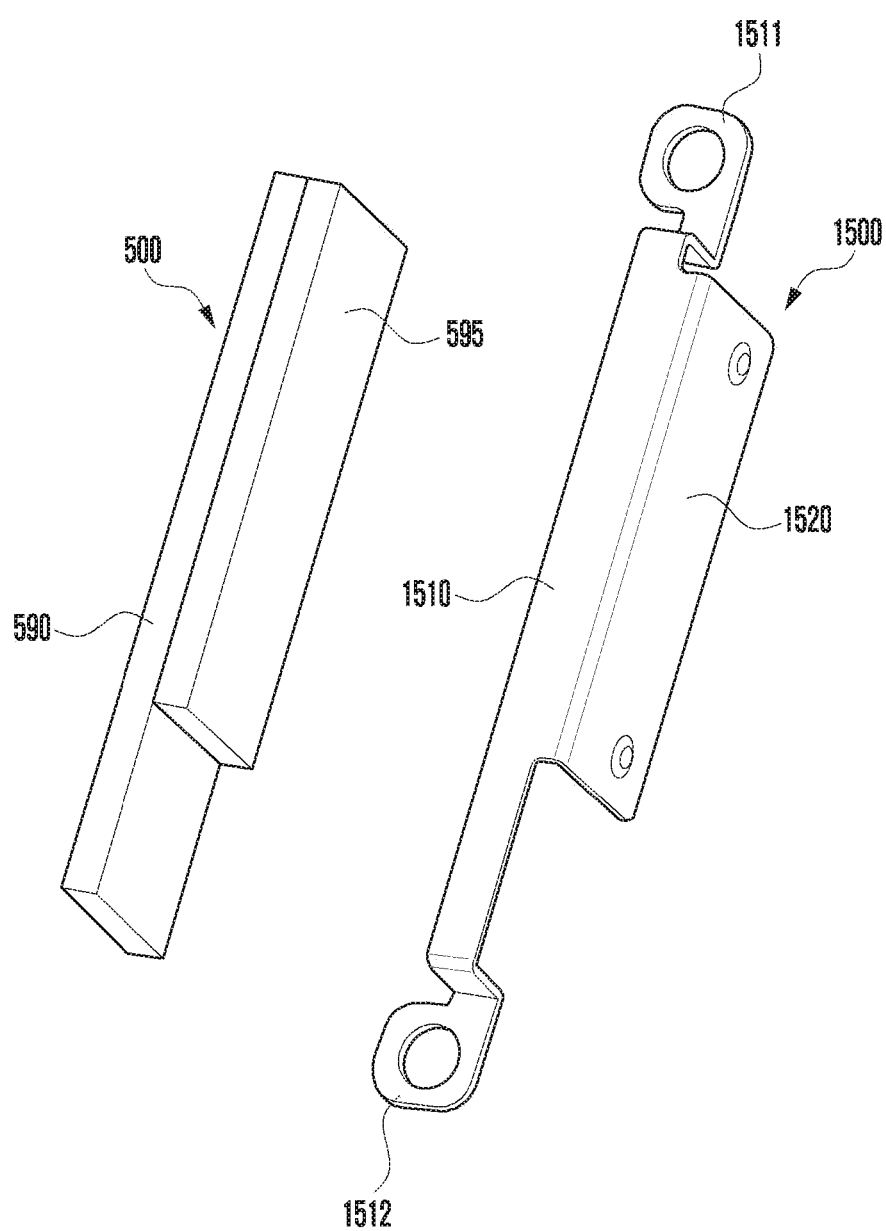
FIGS. 15A and 15B are perspective views showing an antenna module and a support member according to various embodiments of the disclosure.
Figure 15B:
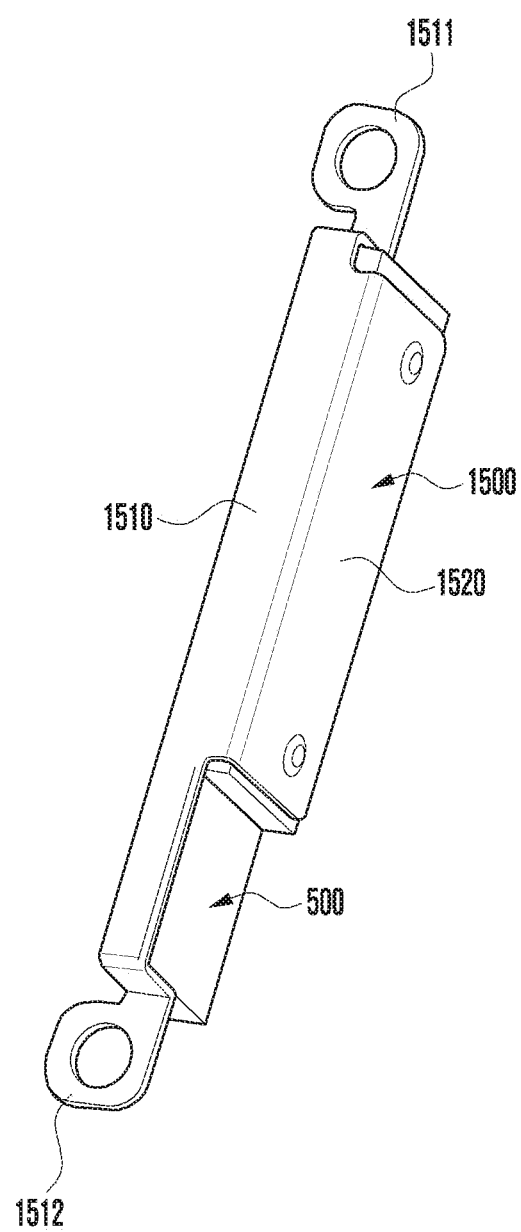

FIGS. 15A and 15B are perspective views showing an antenna module 500 and a support member 1500 according to various embodiments of the disclosure.

According to various embodiments, the PCB 590 of the antenna module 500 may be firmly fixed to the lateral member (e.g., the lateral member 920 in FIG. 14) through the support member 1500.

Referring to FIGS. 15A and 15B, the support member 1500 may be formed to at least partially surround the antenna module 500. According to an embodiment, the support member 1500 may include a first support part 1510 and a second support part 1520. The first support part 1510 may face a side surface of the PCB 590 of the antenna module 500, and the second support part 1520 may be extended from the first support part 1510 and bent to face at least a part of the wireless communication circuit 595. According to an embodiment, the support member 1500 may further include a pair of extension parts 1511 and 1512 extended from both ends of the first support part 1510 and fixed to the lateral member 920. In another embodiment, the pair of extension parts 1511 and 1512 may be extended from the second support part 1520. Therefore, the antenna module 500 may be supported by the first and second support parts 1510 and 1520 of the support member 1500, and fixed to the lateral member 920 through the pair of extension parts 1511 and 1512 fastened to the lateral member 920 by a fastening member (e.g., a screw). According to an embodiment, the support member 1500 may be formed of a metal member (e.g., SUS plate) for heat dissipation.

Figure 16:
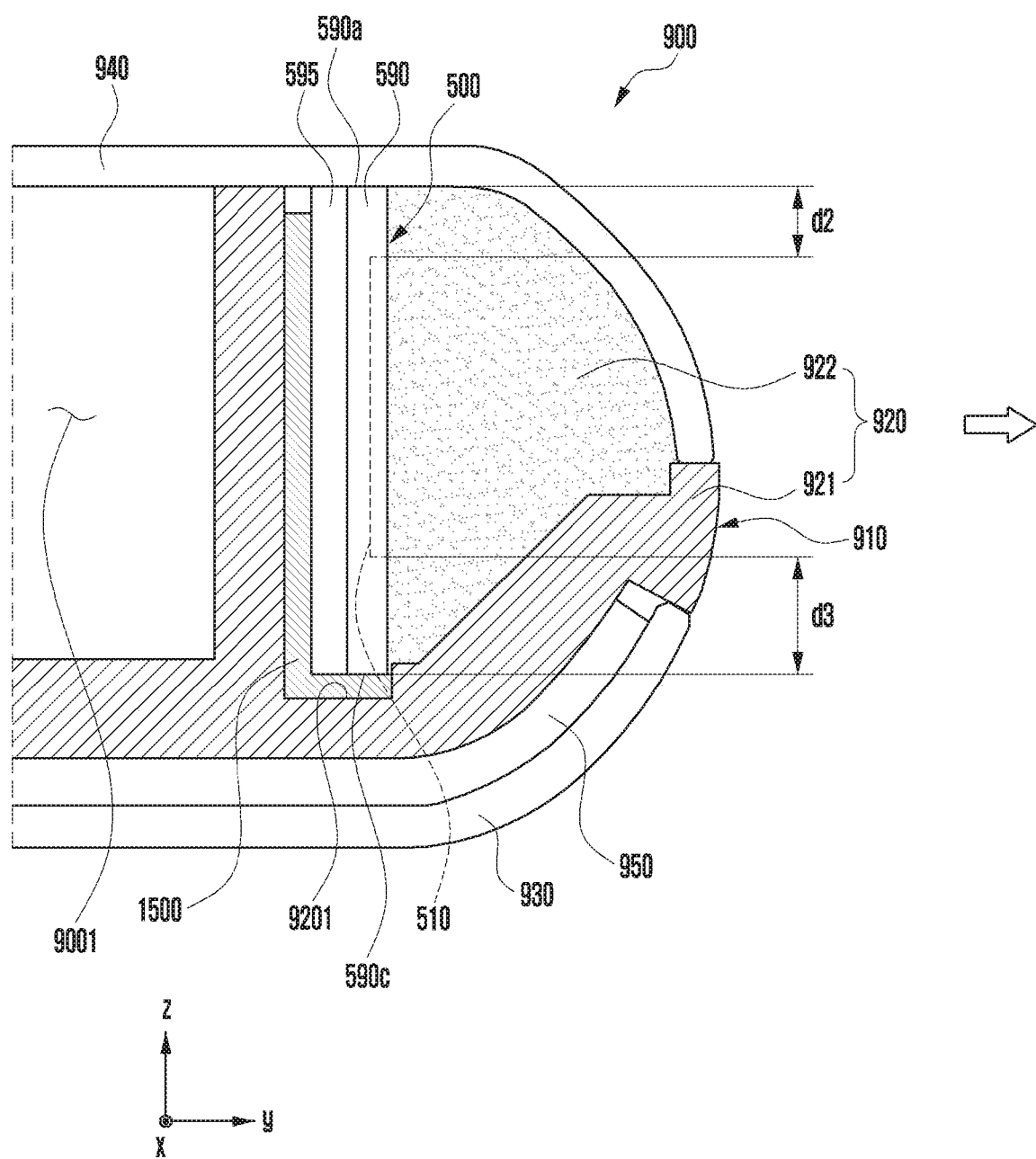
FIG. 16 is a cross-sectional view taken along the line D-D' in FIG. 14 according to an embodiment of the disclosure.

FIG. 16 is a cross-sectional view taken along the line D-D' in FIG. 14 according to an embodiment of the disclosure.

FIG. 16 shows a state in which the antenna module 500 shown in FIG. 14 is disposed in the inner space 9001 of the electronic device 900 through the support member 1500 shown in FIGS. 15A and 15B.

Referring to FIG. 16, the electronic device 900 may include the housing 910 that includes the front plate 930 facing the first direction (the −Z direction), the rear plate 940 facing the second direction (the Z direction) opposite to the first direction, and the lateral member 920 surrounding the inner space 9001 between the front plate 930 and the rear plate 940. According to an embodiment, the lateral member 920 may include the conductive portion 921 disposed at least in part and the polymer portion 922 (i.e., the non-conductive portion) insert-injected into the conductive portion 921. According to an embodiment, the electronic device 900 may include a display 950 (e.g., the display 301 in FIG. 3A) such as a flexible display disposed to be visible from the outside through at least a part of the front plate 930.

According to various embodiments, the antenna module 500 may be mounted in the module mounting portion 9201 of the lateral member 920. In this case, the first conductive patch 510 may be disposed in the PCB 590 to face a direction of the lateral member 920 (an illustrated arrow direction). According to an embodiment, the first conductive patch 510 may be disposed at a position spaced apart from the conductive portion 921 as much as possible when the lateral member 920 is viewed from the outside. For example, the first conductive patch 510 may be disposed such that a first distance (d2) between the first conductive patch 510 and the first side 590*a* of the PCB 590 is shorter than a second distance (d3) between first conductive patch 510 and the third side 590*c* of the PCB 590.

According to various embodiments, the electronic device 900 may include the support member 1500 disposed between the antenna module 500 and the module mounting portion 9201 of the lateral member 920. According to an embodiment, the support member 1500 may be disposed to cover at least a part of the side surfaces of the PCB 590 (e.g., a side surface facing the module mounting portion 9201) and also cover the wireless communication circuit 595 disposed on the rear surface of the PCB 590 (e.g., the second surface 592 in FIG. 5A). In addition, the support member 1500 may be fixed to the lateral member 920 through the extension part (e.g., the pair of extension parts 1511 and 1512 in FIG. 15A).

Figure 17:
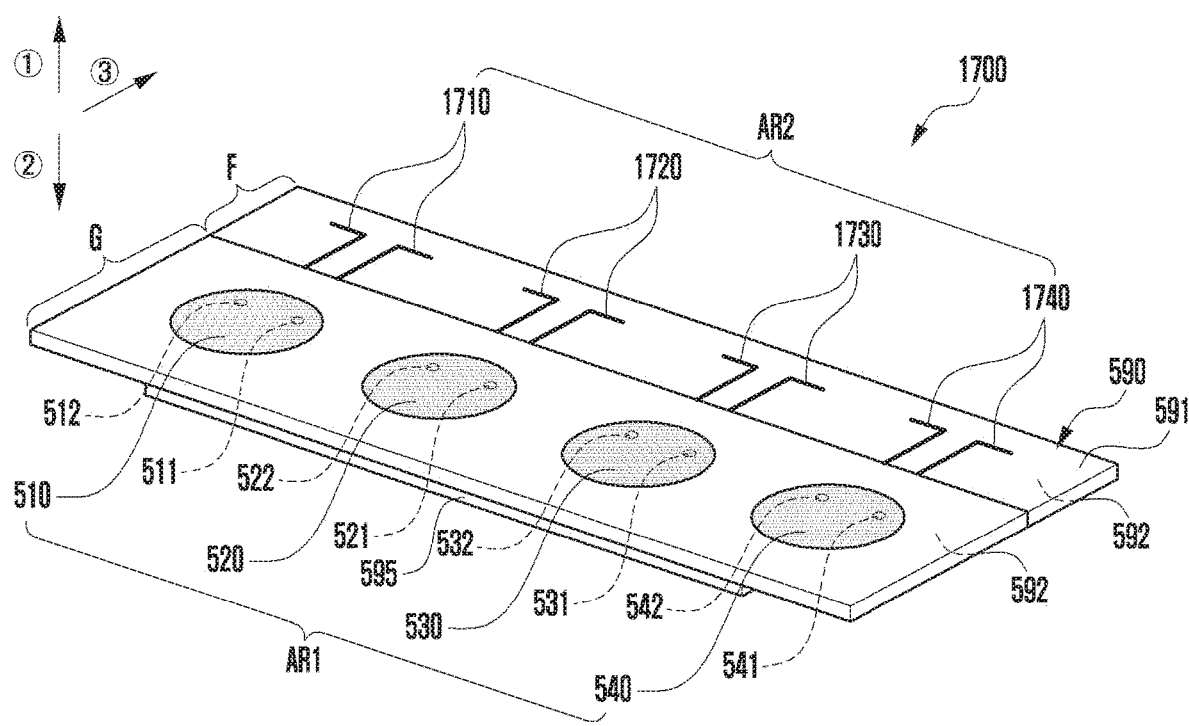
FIG. 17 is a perspective view showing an antenna module according to various embodiments of the disclosure according to an embodiment of the disclosure.

FIG. 17 is a perspective view showing an antenna module 1700 according to an embodiment of the disclosure.

The antenna module 1700 of FIG. 17 may be similar, at least in part, to the third antenna module 246 of FIG. 2, or may include other embodiments of the antenna module.

A first antenna array AR1 of the antenna module shown in FIG. 17 has the substantially same configuration as that of the above-described (antenna array) AR1 shown in FIGS. 5A and 5B, so that a detailed description will be omitted.

Referring to FIG. 17, the antenna module 1700 may include the first antenna array AR1 and a second antenna array AR2 which are disposed on the first surface 591 of the PCB 590 or near the first surface 591 in the PCB 590. According to an embodiment, the PCB 590 may have the first surface 591 facing the first direction (denoted by □) (e.g., the −Z direction in FIG. 3B) and the second surface 592 facing the second direction (denoted by □) (e.g., the Z direction in FIG. 3A) opposite to the first direction. According to an embodiment, the antenna module 1700 may include the wireless communication circuit 595 disposed on the second surface 592 of the PCB 590. According to an embodiment, the PCB 590 may include a ground region G and a fill-and-cut region F. The ground region G may include the first antenna array AR1 and a ground layer (e.g., the ground layer 5903 in FIG. 6). The fill-and-cut region F (e.g., a non-conductive region) adjoins the ground region G.

According to various embodiments, the second antenna array AR2 may include a plurality of conductive patterns 1710, 1720, 1730, and 1740 in the fill-and-cut region F of the PCB 590. According to an embodiment, the plurality of conductive patterns 1710, 1720, 1730, and 1740 may include a first conductive pattern 1710, a second conductive pattern 1720, a third conductive pattern 1730, and/or a fourth conductive pattern 1740. According to an embodiment, the plurality of conductive patterns 1710, 1720, 1730, and 1740 may be electrically connected to the wireless communication circuit 595. According to an embodiment, the plurality of conductive patterns 1710, 1720, 1730, and 1740 may operate as a dipole antenna. According to an embodiment, the wireless communication circuit 595 may be configured to transmit and/or receive a signal having a frequency in the range of 3 GHz to 100 GHz via the second antenna array AR2.

According to various embodiments, the antenna module 1700 may be configured to form a beam pattern in a first direction (denoted by 1̂) (e.g., the X direction in FIG. 3A or FIG. 16) through the first antenna array AR1. According to an embodiment, the antenna module 1700 may be configured to form a beam pattern in a third direction (denoted by 3̂) (e.g., the −Z direction in FIG. 3B or the Z direction in FIG. 16) perpendicular to the first direction through the second antenna array AR2.

According to various embodiments, the antenna module 1700 may include the first antenna array AR1 having the conductive patches 510, 520, 530, and 540 in a 1×4 arrangement, and/or the second antenna array AR2 having the conductive patterns 1710, 1720, 1730, and 1740 in a 1×4 arrangement. In another embodiment, the antenna module 1700 may include one conductive patch and one conductive pattern. In still another embodiment, the antenna module 1700 may include conductive patches and conductive patterns having a multi-row multi-column arrangement.

As described above, two feeders disposed in the conductive patch according to various embodiments of the disclosure are arranged to be affected by the same size of the ground. Therefore, the two feeders can maintain the same radiation performance, thus causing the radiation performance of the antenna module to be improved.

According to various embodiments of the disclosure, an electronic device (e.g., the electronic device 300 in FIG. 3A) may include a housing (e.g., the housing 310 in FIG. 3A) and an antenna structure (e.g., the antenna array AR1 in FIG. 5B). The housing may include a front plate (e.g., the front plate 302 in FIG. 3A) facing a first direction (e.g., the Z direction in FIG. 3A), a rear plate (e.g., the rear plate 311 in FIG. 3B) facing a direction opposite to the first direction, and a lateral member (e.g., the lateral member 318 in FIG. 3A) surrounding a space between the front plate and the rear plate. The antenna structure may be disposed in the space and include a printed circuit board (PCB) (e.g., the PCB 590 in FIG. 5B) disposed in the space and including a ground layer (e.g., the ground layer 5903 in FIG. 6) at least in part. The antenna structure may further include at least one conductive patch (e.g., the conductive patches 510, 520, 530, and 540 in FIG. 5B) disposed on the PCB in a second direction (e.g., a direction parallel with the first side 590a of the PCB 590 in FIG. 5B) and configured to transmit and/or receive first and second signals having a frequency between about 3 GHz and about 100 GHz. The conductive patch may include a first feeder (e.g., the feeders 511, 521, 531, and 541 in FIG. 5B) and a second feeder (e.g., the feeders 512, 522, 532, and 542 in FIG. 5B). The first feeder may be disposed on a first virtual line (e.g., the first virtual line L1 in FIG. 5B) passing through a center (e.g., the center C in FIG. 5B) of the conductive patch and forming a first angle (e.g., the first angle θ1 in FIG. 5B) with respect to a virtual axis (e.g., the second axis X2 in FIG. 5B) passing through the center and perpendicular to the second direction, and configured to transmit and/or receive the first signal having a first polarization. The second feeder may be disposed on a second virtual line (e.g., the second virtual line L2 in FIG. 5B) passing through the center and forming a second angle (e.g., the second angle θ2 in FIG. 5B) with respect to the virtual axis, and configured to transmit and/or receive the second signal having a second polarization perpendicular to the first polarization. A sum of the first and second angles may be substantially 90 degrees.

According to various embodiments, the electronic device may further include a wireless communication circuit (e.g., the wireless communication circuit 595 in FIG. 5B) disposed on the PCB and configured to transmit and/or receive a signal having a frequency between about 3 GHz and about 100 GHz through the at least one conductive patch.

According to various embodiments, the PCB may include a first surface (e.g., the first surface 591 in FIG. 5B) and a second surface (e.g., the second surface 592 in FIG. 5B) facing in a direction opposite to the first surface, the conductive patch may be disposed on the first surface or at a position close to the first surface in the PCB, and the wireless communication circuit may be disposed on the second surface.

According to various embodiments, the conductive patch may be disposed eccentrically in a direction of the virtual axis on the PCB.

According to various embodiments, the PCB may be disposed perpendicular to the front plate in the space such that the conductive patch faces the lateral member.

According to various embodiments, the lateral member may include a conductive portion (e.g., the conductive portion 921 in FIG. 10B) disposed at least in part and a polymer portion (e.g., the polymer portion 922 in FIG. 10B) extended from the conductive portion, and the polymer portion may be disposed, at least in part, in a region of the lateral member (e.g., the lateral member 920 in FIG. 10B) facing the conductive patch (e.g., the conductive patch 510 in FIG. 10B).

According to various embodiments, the PCB may be disposed to overlap, at least in part, with the conductive portion when the lateral member is viewed from outside.

According to various embodiments, a first vertical distance (e.g., the first vertical distance (h1) in FIG. 10B) from the conductive portion to the first feeder is equal to a second vertical distance (e.g., the second vertical distance (h2) in FIG. 10B) from the conductive portion to the second feeder when the lateral member is viewed from outside.

According to various embodiments, at least a part of the conductive patch may be disposed to overlap with the conductive portion when the lateral member is viewed from outside.

According to various embodiments, the conductive patch may be disposed such that a first distance (e.g., the first distance (d2) in FIG. 14) between the conductive patch and a first side of the PCB is shorter than a second distance (e.g., the second distance (d3) in FIG. 14) between the conductive patch and a third side (e.g., the third side 590c in FIG. 14) of the PCB opposite the first side and overlapping with the conductive portion when the lateral member is viewed from outside.

According to various embodiments, the conductive patch may be formed in a symmetrical shape both widthwise and lengthwise.

According to various embodiments, the conductive patch may have a same shape before and after being rotated.

According to various embodiments, the PCB includes a non-conductive region (e.g., the fill-and-cut region F in FIG. 17) formed at least in part and having at least one conductive pattern (e.g., the conductive patterns 1710, 1720, 1730, and 1740 in FIG. 17).

According to various embodiments, the electronic device may further include a wireless communication circuit disposed on the PCB and configured to transmit and/or receive a signal having a frequency between about 3 GHz and about 100 GHz through the at least one conductive pattern.

According to various embodiments, the wireless communication circuit may form a beam pattern in a direction of the lateral member through the at least one conductive patch, and form another beam pattern in a direction of the rear plate through the at least one conductive pattern.

According to various embodiments, the electronic device may further include a display (e.g., the display 301 in FIG. 3A) disposed in the space to be visible from outside through at least a part of the front plate.

According to various embodiments, an electronic device (e.g., the electronic device 300 in FIG. 3A) may include a housing (e.g., the housing 310 in FIG. 3A), a display (e.g., the display 301 in FIG. 3A), a printed circuit board (PCB) (e.g., the PCB 590 in FIG. 5B), and at least one conductive patch (e.g., the conductive patches 510, 520, 530, and 540 in FIG. 5B). The housing may include a front plate (e.g., the front plate 302 in FIG. 3A) facing a first direction (e.g., the Z direction in FIG. 3A), a rear plate (e.g., the rear plate 311 in FIG. 3B) facing a direction opposite to the first direction, and a lateral member (e.g., the lateral member 318 in FIG. 3A) surrounding a space between the front plate and the rear plate. The display may be disposed in the space to be visible from outside through at least a part of the front plate. The PCB may be disposed in the space and include a ground layer (e.g., the ground layer 5903 in FIG. 6) at least in part. The conductive patch may be disposed on the PCB in a second direction (e.g., a direction parallel with the first side 590a of the PCB 590 in FIG. 5B) and configured to transmit and/or receive first and second signals having a frequency between about 3 GHz and about 100 GHz. The conductive patch may include a first feeder (e.g., the feeders 511, 521, 531, and 541 in FIG. 5B) and a second feeder (e.g., the feeders 512, 522, 532, and 542 in FIG. 5B). The first feeder may be disposed on a first virtual line (e.g., the first virtual line L1 in FIG. 5B) passing through a center (e.g., the center C in FIG. 5B) of the conductive patch and forming a first angle (e.g., the first angle θ1 in FIG. 5B) with respect to a virtual axis (e.g., the second axis X2 in FIG. 5B) passing through the center and perpendicular to the second direction, and configured to transmit and/or receive the first signal having a first polarization. The second feeder may be disposed on a second virtual line (e.g., the second virtual line L2 in FIG. 5B) passing through the center and forming a second angle (e.g., the second angle θ2 in FIG. 5B) with respect to the virtual axis, and configured to transmit and/or receive the second signal having a second polarization perpendicular to the first polarization. A sum of the first and second angles may be substantially 90 degrees.

According to various embodiments, the electronic device may further include a wireless communication circuit (e.g., the wireless communication circuit 595 in FIG. 5B) disposed on the PCB and configured to transmit and/or receive a signal having a frequency between about 3 GHz and about 100 GHz through the at least one conductive patch.

According to various embodiments, the PCB may include a first surface (e.g., the first surface 591 in FIG. 5B) and a second surface (e.g., the second surface 592 in FIG. 5B) facing in a direction opposite to the first surface, the conductive patch may be disposed on the first surface or at a position close to the first surface in the PCB, and the wireless communication circuit may be disposed on the second surface.

According to various embodiments, the conductive patch may be disposed eccentrically in a direction of the virtual axis on the PCB.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a housing comprising; and
 an antenna structure disposed in a space of the housing, the antenna structure comprising:
  a printed circuit board (PCB) including a first side and a second side perpendicularly with respect to the first side, and disposed such that a first surface thereof faces the lateral member of the housing, and
 at least one conductive patch disposed on the PCB to form a beam pattern in a direction that the first surface faces the at least one conductive patch comprising:
  a first feeder disposed on a first virtual line passing through a center of the at least one conductive patch, the first virtual line forming a first angle with respect to a virtual axis, the virtual axis passing through the center and being perpendicular to the first side, the first feeder being configured to at least one of transmit or receive a first signal having a first polarization; and a second feeder disposed on a second virtual line passing through the center, the second virtual line forming a second angle with respect to the virtual axis, the second feeder being configured to at least one of transmit or receive a second signal having a second polarization perpendicular to the first polarization, wherein a sum of the first and second angles are substantially 90 degrees, wherein the lateral member includes a conductive portion and a non-conductive portion extending from the conductive portion, wherein at least a part of the at least one conductive patch overlaps with the conductive portion when the lateral member is viewed from outside, and wherein the first feeder and the second feeder of the at least one conductive patch overlap with the non-conductive portion when the lateral member is viewed from outside.

2. The electronic device of claim 1, further comprising:
a wireless communication circuit disposed on the PCB and configured to at least one of transmit or receive a signal having a frequency between 3 GHz and 100 GHz through the at least one conductive patch.

3. The electronic device of claim 2,
wherein the PCB comprises a second surface facing a direction opposite to the first surface,
wherein the at least one conductive patch is disposed on the first surface or at a position close to the first surface of the PCB, and
wherein the wireless communication circuit is disposed on the second surface.

4. The electronic device of claim 1, wherein the at least one conductive patch is disposed eccentrically in a direction of the virtual axis on the PCB.

5. The electronic device of claim 1, wherein the PCB is disposed such that the at least one conductive patch faces the lateral member.

6. The electronic device of claim 1, wherein the PCB is disposed to overlap, at least in part, with the conductive portion when the lateral member is viewed from outside.

7. The electronic device of claim 1, wherein a first vertical distance from the conductive portion to the first feeder is equal to a second vertical distance from the conductive portion to the second feeder when the lateral member is viewed from outside.

8. The electronic device of claim 1, wherein the at least one conductive patch is disposed such that a first distance between the at least one conductive patch and the first side of the PCB is shorter than a second distance between the at least one conductive patch and a third side of the PCB opposite to the first side and overlapping with the conductive portion when the lateral member is viewed from outside.

9. The electronic device of claim 1, wherein the at least one conductive patch is formed in a symmetrical shape both widthwise and lengthwise.

10. The electronic device of claim 1, wherein the at least one conductive patch comprises a same shape before and after being rotated.

11. The electronic device of claim 1, wherein the PCB comprises a non-conductive region formed at least in part and having at least one conductive pattern.

12. The electronic device of claim 11, further comprising:
a wireless communication circuit disposed on the PCB and configured to at least one of transmit or receive a signal having a frequency between 3 GHz and 100 GHz through the at least one conductive pattern.

13. The electronic device of claim 12,
wherein the housing further comprises a front plate and a rear plate facing a direction opposite to the front plate, the lateral member surrounding a space between the front plate and the rear plate, and
wherein the wireless communication circuit forms the beam pattern in a direction of the lateral member through the at least one conductive patch, and forms another beam pattern in a direction of the rear plate through the at least one conductive pattern.

14. The electronic device of claim 1, further comprising:
a display disposed in the space and visible from outside through at least a part of the housing.

15. An electronic device comprising:
a housing comprising:
a front plate facing a first direction,
a rear plate facing a direction opposite to the first direction, and
a lateral member surrounding a space between the front plate and the rear plate;
a display disposed in the space and visible from outside through at least a part of the front plate;
a printed circuit board (PCB) disposed in the space and comprising a ground layer at least in part; and
at least one conductive patch disposed on the PCB in a second direction, the at least one conductive patch being configured to at least one of transmit or receive first and second signals, the at least one conductive patch comprising:
a first feeder disposed on a first virtual line passing through a center of the conductive patch, the first virtual line forming a first angle with respect to a virtual axis, the virtual axis passing through the center and being perpendicular to the second direction, the first feeder being configured to at least one of transmit or receive the first signal having a first polarization, and
a second feeder disposed on a second virtual line passing through the center, the second virtual line forming a second angle with respect to the virtual axis, the second feeder being configured to at least one of transmit or receive the second signal having a second polarization perpendicular to the first polarization, wherein a sum of the first and second angles are substantially 90 degrees,
wherein the lateral member includes a conductive portion and a non-conductive portion extending from the conductive portion,
wherein at least a part of the at least one conductive patch overlaps with the conductive portion when the lateral member is viewed from outside, and
wherein the first feeder and the second feeder of the at least one conductive patch overlap with the non-conductive portion when the lateral member is viewed from outside.

16. The electronic device of claim 15, further comprising:
a wireless communication circuit disposed on the PCB and configured to at least one of transmit or receive a signal having a frequency between 3 GHz and 100 GHz through the at least one conductive patch.

17. The electronic device of claim 16,
wherein the PCB comprises a first surface and a second surface facing a direction opposite to the first surface, wherein the at least one conductive patch is disposed on the first surface or at a position close to the first surface of the PCB, and wherein the wireless communication circuit is disposed on the second surface.

18. The electronic device of claim 15, wherein the at least one conductive patch is disposed eccentrically in a direction of the virtual axis on the PCB.

* * * * *